(12) United States Patent
Uoe et al.

(10) Patent No.: US 9,302,212 B2
(45) Date of Patent: Apr. 5, 2016

(54) PRODUCTION METHOD FOR HONEYCOMB STRUCTURE

(71) Applicant: SUMITOMO CHEMICAL COMPANY, LIMITED, Tokyo (JP)

(72) Inventors: Kousuke Uoe, Niihama (JP); Teruo Komori, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 1 day.

(21) Appl. No.: 14/435,361

(22) PCT Filed: Oct. 7, 2013

(86) PCT No.: PCT/JP2013/077262
§ 371 (c)(1),
(2) Date: Apr. 13, 2015

(87) PCT Pub. No.: WO2014/061496
PCT Pub. Date: Apr. 24, 2014

(65) Prior Publication Data
US 2015/0231546 A1 Aug. 20, 2015

(30) Foreign Application Priority Data
Oct. 15, 2012 (JP) ................. P2012-228176

(51) Int. Cl.
*B32B 37/00* (2006.01)
*B01D 46/24* (2006.01)
(Continued)

(52) U.S. Cl.
CPC ........ *B01D 46/2444* (2013.01); *B01D 46/0001* (2013.01); *F01N 3/0222* (2013.01); *F01N 2330/30* (2013.01)

(58) Field of Classification Search
CPC ...... B29C 65/08; B28B 11/006; B32B 37/06; B01D 46/2444; B01D 46/0001; F01N 3/0222
USPC .................... 156/73.1, 580.1, 580.2
See application file for complete search history.

(56) References Cited

U.S. PATENT DOCUMENTS 4,293,357 A   10/1981 Higuchi et al.
7,541,085 B2 * 6/2009 Burdon .............. B29D 99/0021
                                                156/60

(Continued)

FOREIGN PATENT DOCUMENTS

JP          63-24731 B2    5/1988
JP          2004-19498 A   1/2004

(Continued)

OTHER PUBLICATIONS

International Preliminary Report on Patentability and Written Opinion issued Apr. 30, 2015 in counterpart International Application No. PCT/JP2013/077262.

(Continued)

*Primary Examiner* — James Sells
(74) *Attorney, Agent, or Firm* — Sughrue Mion, PLLC

(57) ABSTRACT

Regular hexagonal cells at both an top surface and a bottom surface of a green honeycomb molded body are closed at the same time. Therefore, the regular hexagonal cells can be closed effectively. In addition, the regular hexagonal cells of the green honeycomb molded body are closed by welding partition walls with each other, by inserting each of closing protrusions of a closing jig into the plurality of regular hexagonal cells. Therefore, a closing paste like the conventional method is not required. In a case where a honeycomb structure is used for a diesel particulate filter, turbulence of exhaust gas flow, at the end surface of the side to supply the exhaust gas and/or the side to discharge the exhaust gas, is reduced, and pressure drop can be reduced.

6 Claims, 34 Drawing Sheets

(51) Int. Cl.
*B01D 46/00* (2006.01)
*F01N 3/022* (2006.01)

(56) References Cited

U.S. PATENT DOCUMENTS

| | | | |
|---|---|---|---|
| 8,349,432 B2 * | 1/2013 | Higuchi | B01D 46/2474 |
| | | | 156/89.22 |
| 2004/0018123 A1 | 1/2004 | Okawara et al. | |
| 2004/0055264 A1 | 3/2004 | Itoh | |
| 2006/0197252 A1 | 9/2006 | Ishikawa et al. | |
| 2008/0292843 A1 * | 11/2008 | Oya | B01D 46/2429 |
| | | | 428/116 |
| 2009/0252906 A1 * | 10/2009 | Higuchi | B01D 46/2474 |
| | | | 428/34.4 |

FOREIGN PATENT DOCUMENTS

| | | |
|---|---|---|
| JP | 2004-116369 A | 4/2004 |
| JP | 2004-322051 A | 11/2004 |
| JP | 2006-272318 A | 10/2006 |
| JP | 2007-296806 A | 11/2007 |

OTHER PUBLICATIONS

International Search Report for PCT/JP2013/077262 dated Dec. 17, 2013 [PCT/ISA/210].

* cited by examiner

PRODUCTION METHOD FOR HONEYCOMB STRUCTURE

CROSS REFERENCE TO RELATED APPLICATIONS

This application is a National Stage of International Application No. PCT/JP2013/077262, filed on Oct. 7, 2013, which claims priority from Japanese Patent Application No. 2012-228176, filed on Oct. 15, 2012, the contents of all of which are incorporated herein by reference in their entirety.

TECHNICAL FIELD

An embodiment of the present invention relates to a production method for a honeycomb structure, and relates to a production method for the honeycomb structure, which becomes the honeycomb structure by calcining a green honeycomb molded body.

BACKGROUND ART

Conventionally, for example, a ceramic honeycomb structure, having a plurality of through holes, with a polygonal cross sectional shape has been known. Such a honeycomb structure is used for a diesel particulate filter and so on. Such a honeycomb structure is produced by making a green honeycomb molded body by molding a ceramic raw material powder by an extrusion method and so on, and by closing and calcining this green honeycomb molded body after being cut in a desired length. Then, in Patent Literature 1, the production method for the honeycomb structure has been disclosed. In Patent Literature 1, by pressing a closing member with a piston against one end of the honeycomb structure arranged in a cylinder, the closing member is supplied to the end of through holes of the honeycomb structure, and the through holes are closed.

CITATION LIST

Patent Literature

[Patent Literature 1] Japanese Patent Application Laid-Open Publication No. 63-24731

SUMMARY OF INVENTION

Technical Problem

However, in the above-described method in Patent Literature 1, the efficiency of closing is still desired to be improved. In addition, the closing member such as a closing paste is separately required for closing. Moreover, in a case where the honeycomb structure is used for the diesel particulate filter, when the side, in which the through holes have been closed, is made the side to supply exhaust gas and/or the side to discharge the exhaust gas, turbulence of exhaust gas flow, at the end surfaces of the side to supply the exhaust gas and/or the side to discharge the exhaust gas, is generated, and pressure drop may be generated.

An embodiment of the present invention has been made in view of the above problem, and an object thereof is to provide a production method for a honeycomb structure, which can close through holes more effectively, does not separately require the closing member such as the closing paste, and can reduce the pressure drop at the end surface of the side to supply the exhaust gas and/or the side to discharge the exhaust gas.

Solution to Problem

An embodiment of the present invention is a production method for a honeycomb structure, in which a plurality of holes is opened at end surfaces of a columnar body, including a closing step of closing a part of a plurality of through holes of a green honeycomb molded body, in which the plurality of through holes partitioned from each other by a partition wall is opened at the end surfaces of the columnar body and which becomes the honeycomb structure by being calcined. In the closing step, the through holes of the both end surfaces of the green honeycomb molded body are closed at the same time. The through holes of at least the one end surface of the green honeycomb molded body are closed by welding the partition walls with each other, by inserting each of a plurality of closing protrusions of a closing jig into the part of a plurality of the through holes.

This configuration is the production method for the honeycomb structure, in which the plurality of holes is opened at end surfaces of the columnar body, including the closing step of closing the part of the plurality of through holes of the green honeycomb molded body, in which the plurality of through holes partitioned from each other by the partition wall is opened at the end surfaces of the columnar body and which becomes the honeycomb structure by being calcined. In the closing step, the through holes of the both end surfaces of the green honeycomb molded body are closed at the same time. Therefore, it is possible to close the through holes more effectively compared with the method of closing the through holes separately for each end surface. In addition, the through holes of at least the one end surface of the green honeycomb molded body are closed by welding partition walls with each other, by inserting each of the plurality of closing protrusions of the closing jig into the part of the plurality of the through holes. Therefore, a closing paste like the conventional method is not required. Moreover, since the through holes are closed by welding the partition walls with each other, for example, in a case where the honeycomb structure is used for a diesel particulate filter, the side, in which the through holes are closed by welding the partition walls with each other, is made the side to supply exhaust gas and/or the side to discharge the exhaust gas. As a result, turbulence of exhaust gas flow at the end surface of the side to supply the exhaust gas and/or the side to discharge the exhaust gas is reduced, and pressure drop can be reduced.

In this case, in the closing step, the through holes can be closed by welding the partition walls with each other, by inserting each of the closing protrusions vibrated by ultrasonic wave into the part of the plurality of through holes.

According to this configuration, the through holes are closed by welding the partition walls with each other, by inserting each of the closing protrusions vibrated by ultrasonic wave into the part of the plurality of through holes. The partition walls are liquefied by inserting the closing protrusions vibrated by the ultrasonic wave into the through holes. Therefore, a worked surface is made excellent since fuzz and so on hardly occur. Thus, the ends of the partition walls are surely welded with each other and leakage of closing can be prevented. In addition, since the ends of the welded partition walls are made smooth, in a case where the honeycomb structure is used for the diesel particulate filter, turbulence of exhaust gas flow at the end surface of the side to supply the exhaust gas and/or the side to discharge the exhaust gas is reduced, and the pressure drop can be reduced.

In addition, a supporting step is further included, in which the end surface at a lower side of the green honeycomb molded body, which is immediately after being extrusion-molded from a raw material to vertically downward, is supported by the closing jig. In the closing step, the through holes can be closed by welding the partition walls with each other, by inserting each of the plurality of closing protrusions of the closing jig into the part of the through holes of at least the end surface at the lower side of the green honeycomb molded body, after being supported in the supporting step.

As the diameter of the green honeycomb molded body becomes larger, bend by gravity increases when the green honeycomb molded body is being extrusion-molded from the raw material in the horizontal direction. Therefore, there may be a case where it is difficult to support the green honeycomb molded body by a side surface. However, according to this configuration, in the supporting step, the end surface at the lower side of the green honeycomb molded body, which is immediately after being extrusion-molded from the raw material to vertically downward, is supported by the closing jig. As a result, even the green honeycomb molded body with the large diameter can be supported without causing bend or distortion of the through hole. Moreover, in the subsequent closing step, each of the plurality of closing protrusions of the closing jig is inserted into the part of the through holes of at least the end surface at the lower side of the green honeycomb molded body, after being supported in the supporting step. As a result, the through holes are closed by welding the partition walls with each other. As a result, the supporting step and the closing step can be performed successively with great efficiency.

In this case, the closing jig is selectively changeable between a state where the closing protrusions are housed inside a supporting surface and a state where the closing protrusions are protruded to the outside of the supporting surface. In the supporting step, the end surface at the lower side of the green honeycomb molded body, which is immediately after being extrusion-molded from the raw material to vertically downward, is supported by the supporting surface of the closing jig, in the state where the closing protrusions are housed inside the supporting surface. In the closing step, the through holes can be closed by welding the partition walls with each other, by inserting each of the closing protrusions of the closing jig, in the state where the closing protrusions are protruded to the outside of the supporting surface, into the part of the through holes at the end surface at the lower side of the green honeycomb molded body.

According to the present embodiment, the closing jig is selectively changeable between the state where the closing protrusions are housed inside the supporting surface and the state where the closing protrusions are protruded to the outside of the supporting surface. In the supporting step, the end surface at the lower side of the green honeycomb molded body, which is immediately after being extrusion-molded from the raw material to vertically downward, is supported by the supporting surface of the closing jig, in the state where the closing protrusions are housed inside the supporting surface. Therefore, even the green honeycomb molded body with the large diameter can be more stably supported without causing bend or distortion of the through hole. In addition, in the closing step, each of the closing protrusions of the closing jig, in the state where the closing protrusions are protruded to the outside of the supporting surface, is inserted into the part of the through holes of the end surface at the lower side of the green honeycomb molded body. As a result, the through holes are closed by welding the partition walls with each other. As a result, the through holes can be closed by welding the partition walls with each other, while supporting the green honeycomb molded body.

Advantageous Effects of Invention

According to a production method for a honeycomb structure of one embodiment of the present invention, closing of through holes can be performed more effectively, a closing member such as a closing paste is not separately required, and pressure drop, at the end surface of the side to supply the exhaust gas and/or the side to discharge the exhaust gas, can be reduced.

DESCRIPTION OF EMBODIMENTS

Hereinafter, embodiments of the present invention will be described in detail with reference to the drawings.

First Embodiment

Green Honeycomb Molded Body

Regular Hexagonal Cell

Figures 1A, 1B:
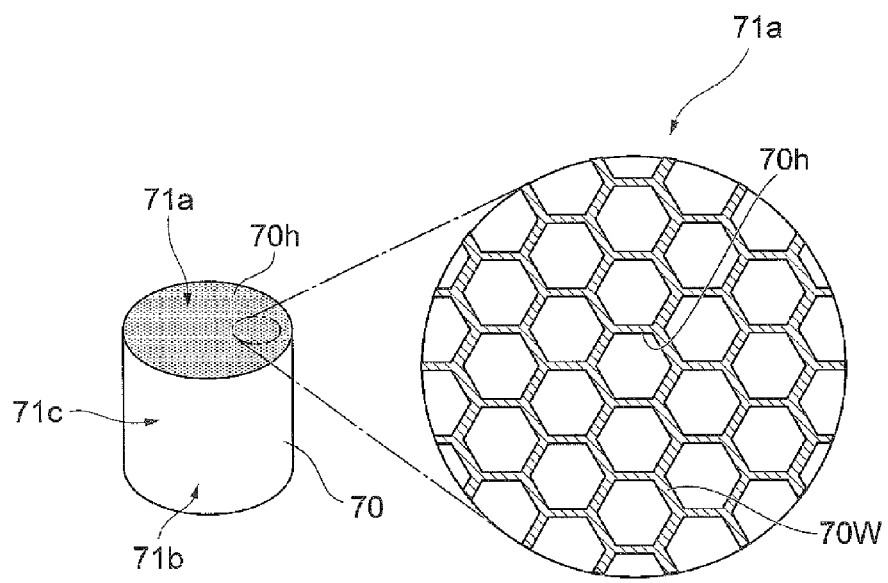
FIG. 1A is a perspective view of a green honeycomb molded body having regular hexagonal cells before closing.
FIG. 1B is a partially enlarged view of FIG. 1A.

First, a green honeycomb molded body, being an object to be processed in the first embodiment of the present invention, will be described. As shown in FIG. 1A, a green honeycomb molded body 70 according to the present embodiment has, for example, an top surface 71a, a bottom surface 71b, and a side surface 71c, and is a cylindrical body, in which a plurality of regular hexagonal cells 70h being regular hexagonal through holes is arranged substantially in parallel at the top surface 71a and the bottom surface 71b. The green honeycomb molded body 70 is a non-calcined molded body, which becomes a porous ceramic by being calcined later. In addition, although the length in the direction, in which the regular hexagonal cells 70h of the green honeycomb molded body 70 extend, is not particularly limited, for example, it may be 40 to 350 mm. In addition, although the outer diameter of the green honeycomb molded body 70 is also not particularly limited, for example, it may be 10 to 320 mm.

Each regular hexagonal cell 70h is partitioned by a partition wall 70W extending substantially in parallel with a central axis of the green honeycomb molded body 70. The thickness of the partition wall 70W may be 0.8 mm or less, 0.5 mm or less, 0.1 mm or more, or 0.2 mm or more. In addition, the outer shape of the green honeycomb molded body 70 is not limited to the cylindrical body, and it may also be an elliptic cylinder, a prism (for example, a regular polygonal prism such as a triangular prism, a quadrangular prism, a hexagonal prism, and an octagonal prism, or a polygonal prism other than the regular polygonal prism such as a triangular prism, a quadrangular prism, a hexagonal prism, or an octagonal prism), and so on. In the present embodiment, a case where the honeycomb structure 70 is the cylindrical body, will be described. In addition, although in the present embodiment, an example of the green honeycomb molded body 70, having the regular hexagonal cells 70h being the regular hexagonal through holes, is given, the green honeycomb molded body 70 may also be the one having cells, being the through holes with a hexagonal shape other than a regular hexagonal shape or a hexagonal shape of a different size.

Such a green honeycomb molded body 70 is produced by extrusion-molding a ceramic composition by an extrusion molding machine. In this case, an inorganic compound source powder being a ceramic raw material, an organic binder, a solvent, and an additive to be added as required, are prepared in order to prepare the ceramic composition.

The inorganic compound source powder includes an aluminum source powder and a titanium source powder. The inorganic compound source powder can further include a magnesium source powder and/or a silicon source powder. Examples of the organic binder can include celluloses such as methyl cellulose, carboxymethyl cellulose, hydroxyalkylmethyl cellulose, and sodium carboxymethyl cellulose; alcohols such as polyvinyl alcohol; and lignin sulfonate. Examples of the additives include a pore-forming agent, a lubricant and a plasticizer, a dispersing agent, and a solvent.

The prepared raw materials are mixed by a kneading machine and so on, and a raw material mixture is obtained. The obtained raw material mixture is extruded from the extrusion molding machine, which has an outlet opening corresponding to the cross-sectional shape of the partition walls 70W. As a result, the green honeycomb molded body according to the present embodiment is produced.

(Ultrasonic Cutting Machine)

Figure 2:
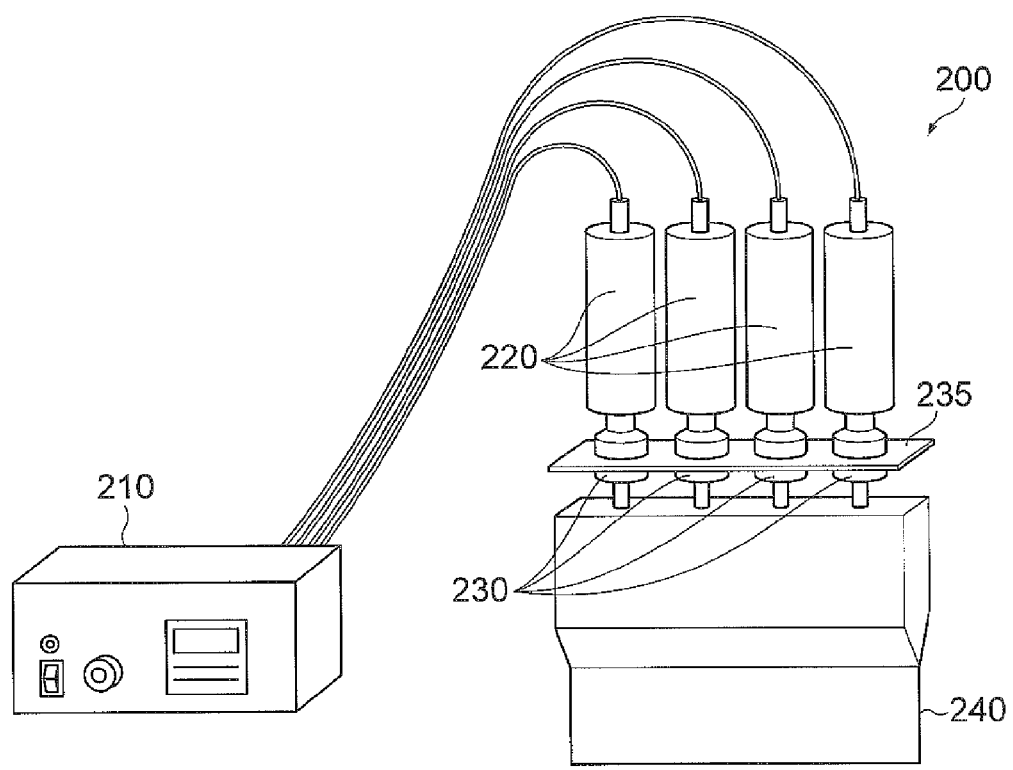
FIG. 2 is a perspective view showing a cutting device of the green honeycomb molded body according to the first embodiment.

Hereinafter, an ultrasonic cutting machine of the present embodiment will be described. As shown in FIG. 2, an ultrasonic cutting machine 200 of the present embodiment includes an ultrasonic signal transmitter 210, an ultrasonic vibrator unit 220, a horn unit 230, a supporting plate 235, and a cutting blade 240. The ultrasonic signal transmitter 210 transmits an electric ultrasonic signal. The ultrasonic vibrator unit 220 converts the electric ultrasonic signal supplied from the ultrasonic signal transmitter 210 into mechanical ultrasonic vibration. The horn unit 230 amplifies the amplitude of the ultrasonic vibration supplied from the ultrasonic vibrator unit 220. In the present embodiment, the plurality of horn units 230 is connected to each of the plurality of ultrasonic vibrator units 220, which is connected to the ultrasonic signal transmitter 210. The plurality of horn units 230 is arranged by the supporting plate 235 in parallel along the blade width of the cutting blade 240. The cutting blade 240 is vibrated at a frequency of about 20 to 40 kHz by the ultrasonic vibration supplied from the horn unit 230.

When the cutting blade 240 abuts on the green honeycomb molded body 70, the abutting part of the green honeycomb molded body 70 is liquefied. Therefore, cutting can be performed at a small machining amount without causing deformation, burr, and so on of the regular hexagonal cell 70h. A mechanism suctioning the liquefied material of the green honeycomb molded body 70 may also be included as required.

(Ultrasonic Closing Machine)

Figure 3:
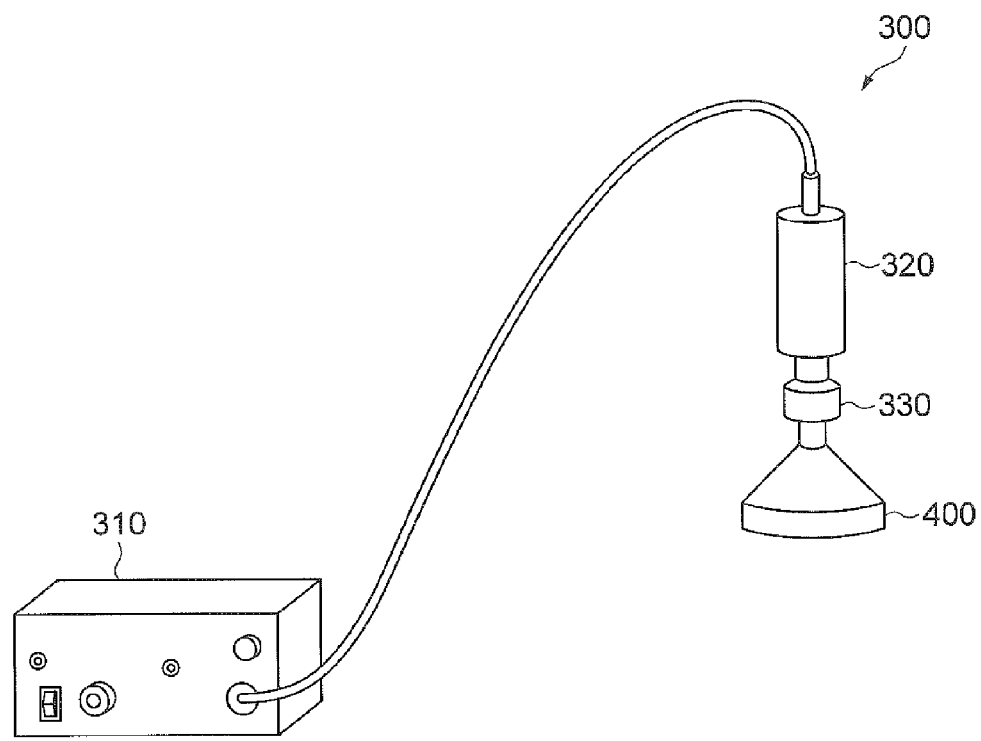
FIG. 3 is a perspective view showing a closing device of the green honeycomb molded body according to the first embodiment.

Hereinafter, an ultrasonic closing machine of the present embodiment will be described. As shown in FIG. 3, an ultrasonic closing machine 300 of the present embodiment includes an ultrasonic signal transmitter 310, an ultrasonic vibrator unit 320, a horn unit 330, and a closing jig 400. The ultrasonic signal transmitter 310 transmits the electric ultrasonic signal as with the above-described ultrasonic cutting machine 200. The ultrasonic vibrator unit 320 converts the electric ultrasonic signal supplied from the ultrasonic signal transmitter 310 into the mechanical ultrasonic vibration. The horn unit 330 amplifies the amplitude of the ultrasonic vibration supplied from the ultrasonic vibrator unit 220. The closing jig 400 is vibrated at the frequency of about 20 to 40 kHz by the ultrasonic vibration supplied from the horn unit 330.

(Closing Jig)

Hereinafter, the closing jig of the present embodiment will be described. In the present embodiment, closing of the regular hexagonal cells 70h is performed in a different form at each of both end surfaces of the green honeycomb molded body 70, having regular hexagonal cells 70h. First, the closing jig to close the top surface 71a will be described. The top surface 71a becomes a supply side (inlet side) of exhaust gas, in a case where the green honeycomb molded body 70 is made a diesel particulate filter after being calcined.

Figure 4:
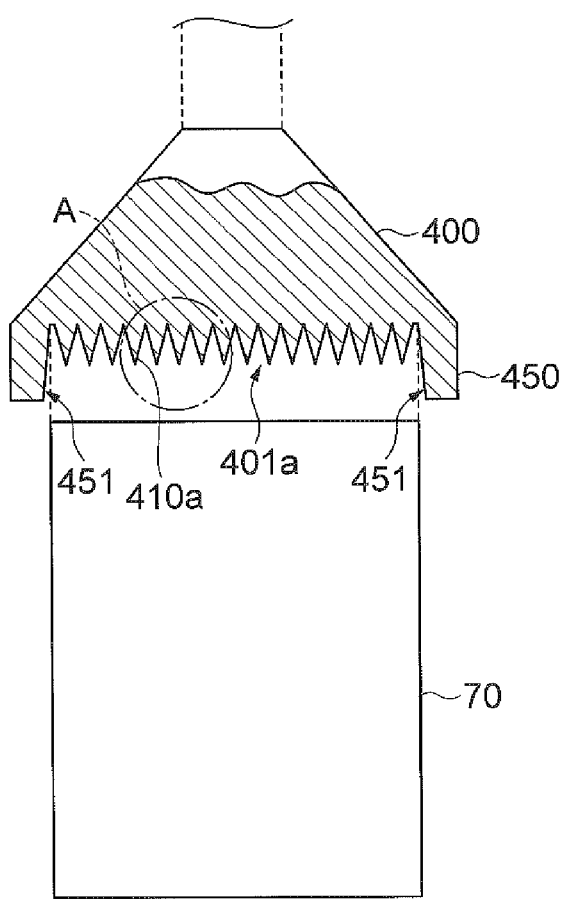
FIG. 4 is a partial cross-sectional view of a closing jig for the inlet side of the green honeycomb molded body having the regular hexagonal cells according to the first embodiment.

As show in FIG. 4, the closing jig 400 of the present embodiment has a closing surface 401a to close the green honeycomb molded body 70, and a support socket portion 450, to which the end of the green honeycomb molded body 70 is fitted. The closing surface 401a includes a plurality of closing protrusions 410a. The plurality of closing protrusions 410a are arranged in the position corresponding to a part of the regular hexagonal cells 70h and inserted into the part of the regular hexagonal cells 70h respectively. As a result, the plurality of closing protrusions 410a closes the regular hexagonal cells 70h by welding the partition walls 70w with each other. The support socket portion 450 includes a cylindrical recess corresponding to the diameter of the green honeycomb molded body 70 to be closed. The inner peripheral surface of the support socket portion 450 is provided with an inclined surface 451, in which the inner diameter of the support socket portion 450 increases as it is apart from the closing surface 401a, so that the end of the green honeycomb molded body 70 is easily inserted.

Figure 5:
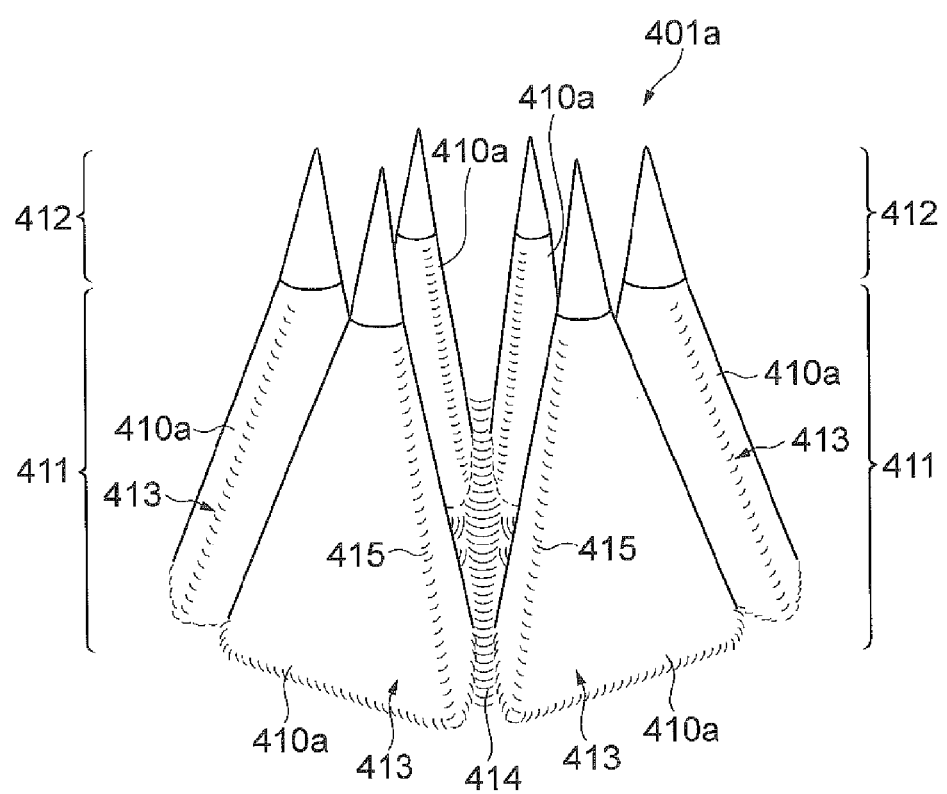
FIG. 5 is a perspective view, in which the portion A in FIG. 4 is enlarged.
Figure 6:
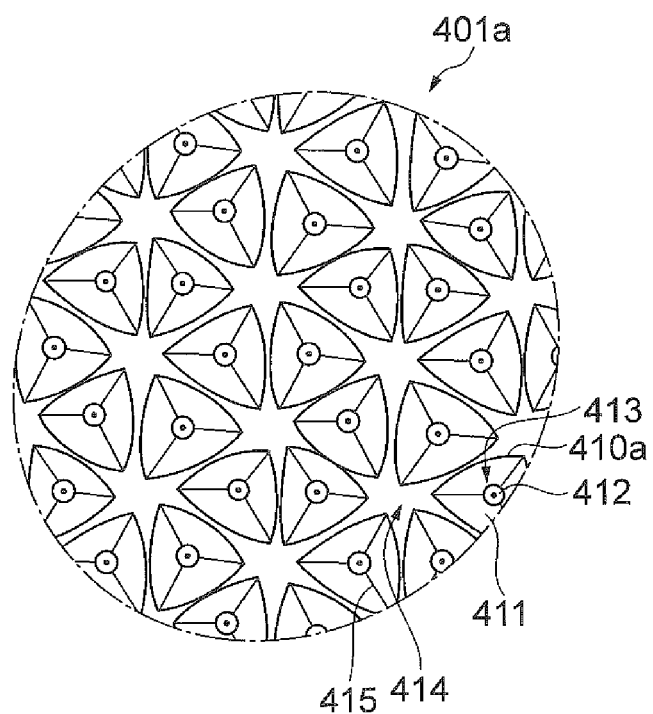
FIG. 6 is a plan view, in which the portion A in FIG. 4 is enlarged.
Figure 7:
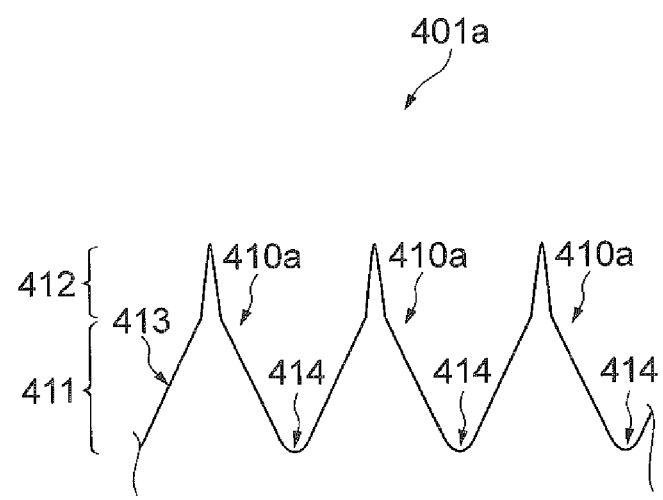
FIG. 7 is a longitudinal cross-sectional view, in which the portion A in FIG. 4 is enlarged.

As shown in FIGS. 5 to 7, in which the portion A in FIG. 4 is enlarged, the closing protrusion 410a has a triangular pyramidal base portion 411 and a conical tip end portion 412. The triangular pyramidal base portion 411 is positioned in the base portion of the closing protrusion 410a and is protruded from the closing surface 401a. The triangular pyramidal base portion 411 has a truncated triangular pyramidal shape, in which, from a triangular pyramid with a vertical angle larger than that of the conical tip end portion 412, a triangular pyramid similarly reduced is removed. The conical tip end portion 412 is a tip part of the closing protrusion 410a and is positioned at the upper part of the triangular pyramidal base portion 411. The conical tip end portion 412 has a conical shape having a bottom surface with the size corresponding to an upper surface of the triangular pyramidal base portion 411.

The vertical angle of the conical tip end portion 412 is smaller than the vertical angle formed by lateral edges of a truncated triangular pyramid of the triangular pyramidal base portion 411.

The triangular pyramidal base portion 411 includes a triangular pyramid side surface portion 413 of a side surface of the truncated triangular pyramid, and a round-chamfered lateral edge portion 415 of the lateral edge of the truncated triangular pyramid. In the round-chamfered lateral edge portion 415, each lateral edge of the truncated triangular pyramid has been round-chamfered by a predetermined curvature. In addition, in a valley between triangular pyramidal base portions 411 of the adjacent closing protrusions 410a, a round-chamfered valley portion 414, being a recess round-chamfered by a predetermined curvature, is included.

As shown in FIG. 6, each closing protrusion 410a is arranged, so that the top of its conical tip end portion 412 is in the position corresponding to each of six regular hexagonal cells 70h. Each of six regular hexagonal cells 70h is adjacent to the periphery of the regular hexagonal cell 70h as a center, which is one of the plurality of the regular hexagonal cells 70h of the green honeycomb molded body 70. In addition, each closing protrusion 410a is arranged in a direction, in which the round-chamfered lateral edge portion 415 of its triangular pyramidal base portion 411 abuts on the partition wall 70W. The size of each triangular pyramidal base portion 411 is set, so that the length of a projection of the round-chamfered lateral edge portion 415 on the closing surface 401a from right above the closing surface 401a becomes the length between opposite sides of the regular hexagonal cell 70h of the green honeycomb molded body 70 or the length slightly shorter than it.

Figure 8:
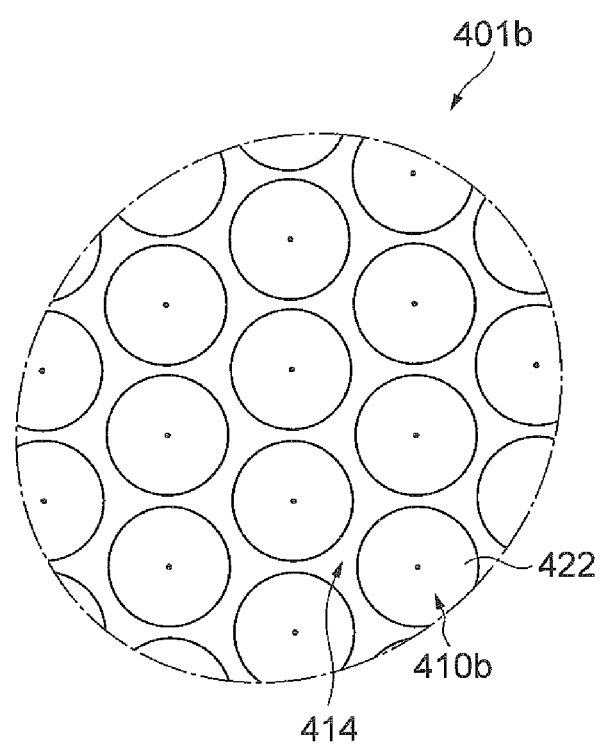
FIG. 8 is a plan view, in which a part, corresponding to the portion A in FIG. 4 of the closing jig for the outlet side of the green honeycomb molded body having the regular hexagonal cells according to the first embodiment, is enlarged.

The closing jig 400 to close the bottom surface 71b will be described. The bottom surface 71b becomes an exhaust side (outlet side) of the exhaust gas, in a case where the green honeycomb molded body 70 is made the diesel particulate filter after being calcined. As shown in FIG. 8, a closing surface 401b to close the bottom surface 71b includes conical closing protrusions 410b. The closing protrusion 410b has a conical side surface portion 422. As with the closing surface 401a, in a valley between adjacent closing protrusions 410b, the round-chamfered valley portion 414, a recess is included. The recess has been round-chamfered by a predetermined curvature.

As shown in FIG. 8, each closing protrusion 410b is arranged, so that its top is in the position corresponding to the regular hexagonal cell 70h, which is one of the plurality of regular hexagonal cells 70h of the green honeycomb molded body 70. The periphery of the regular hexagonal cell 70h is surrounded by the adjacent six regular hexagonal cells 70h. The one regular hexagonal cell 70h, in which this closing protrusion 410b is in the corresponding position, is the one regular hexagonal cell 70h, the periphery of which is surrounded by the six regular hexagonal cells 70h. The six regular hexagonal cells 70h are in the positions corresponding to the closing protrusions 410a in the top surface 71a.

Therefore, in the top surface 71a, the closing protrusions 410a are inserted into six regular hexagonal cells 70h, each of which is adjacent to the periphery of the one regular hexagonal cell 70h as a center. In the bottom surface 71b, the closing protrusion 410b is inserted into the one regular hexagonal cell 70h surrounded by the adjacent six regular hexagonal cell 70h, into which the closing protrusions 410a are inserted in the top surface 71a. The size of each closing protrusion 410b is set, so that the radius of a bottom surface of the closing protrusion 410b is the length between the opposite sides of the regular hexagonal cell 70h of the green honeycomb molded body 70 or the length slightly shorter than it.

(Cutting Step)

Figure 9:
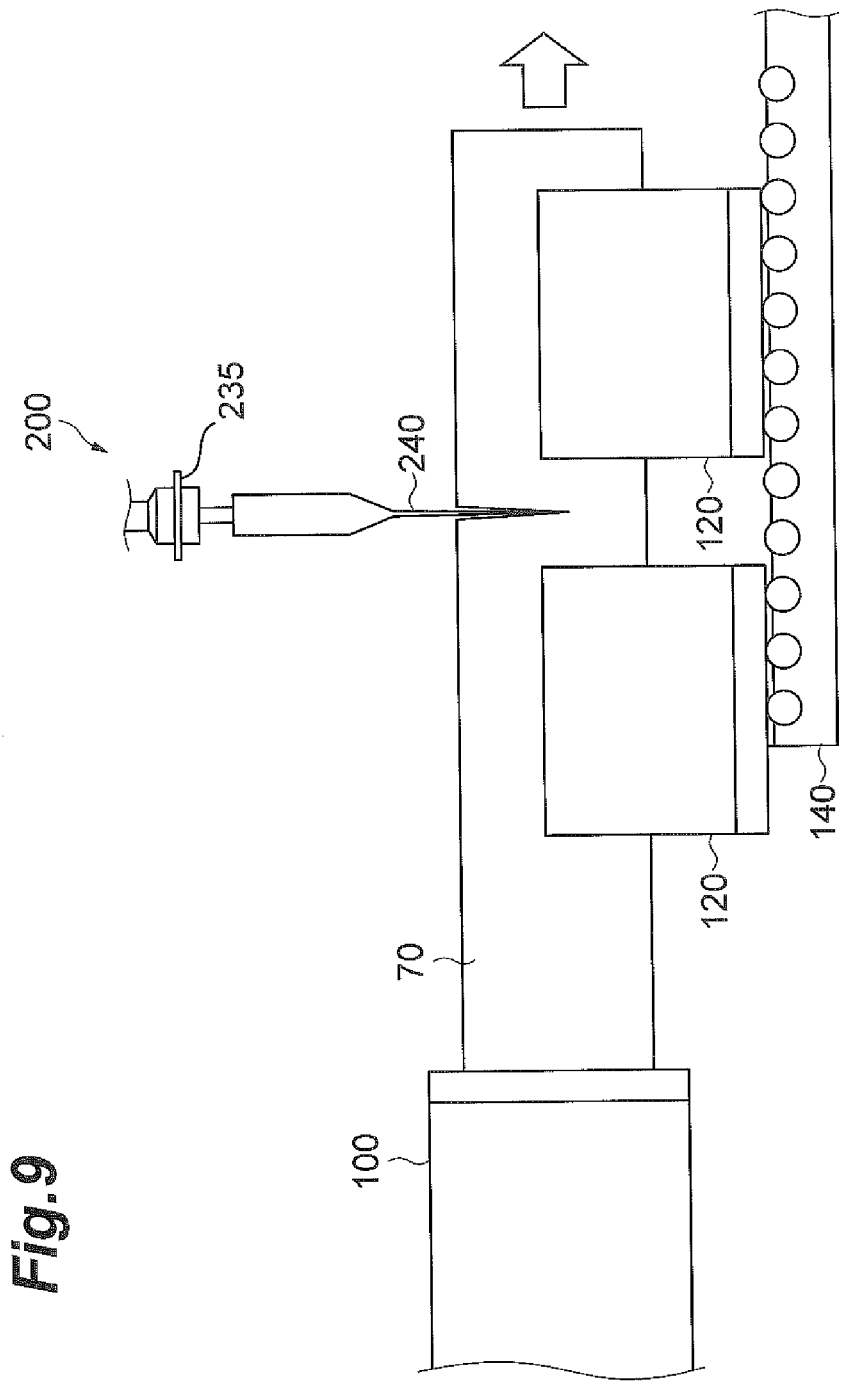
FIG. 9 is a side view showing a cutting step of the green honeycomb molded body according to the first embodiment.

Hereinafter, cutting step of the green honeycomb molded body 70 of the present embodiment will be described. As shown in FIG. 9, the green honeycomb molded body 70 according to the present embodiment is produced by extruding the raw material mixture prepared as described above by an extrusion molding machine 100, having the outlet opening corresponding to the cross-sectional shape of the partition walls 70W.

The extruded green honeycomb molded body 70 is supported by a stand 120, having flexibility such as sponge, each time a predetermined length is extruded. Each stand 120 supporting the green honeycomb molded body 70 is carried sequentially on a roller conveyor 140 in the direction where the green honeycomb molded body 70 is extruded. The carried green honeycomb molded body 70 is cut in a predetermined length by the cutting blade 240 vibrated by an ultrasonic wave of the ultrasonic cutting machine 200, so that the top surface 71a and the bottom surface 71b perpendicular to the side surface 71c are formed.

(Closing Step)

Figure 10:
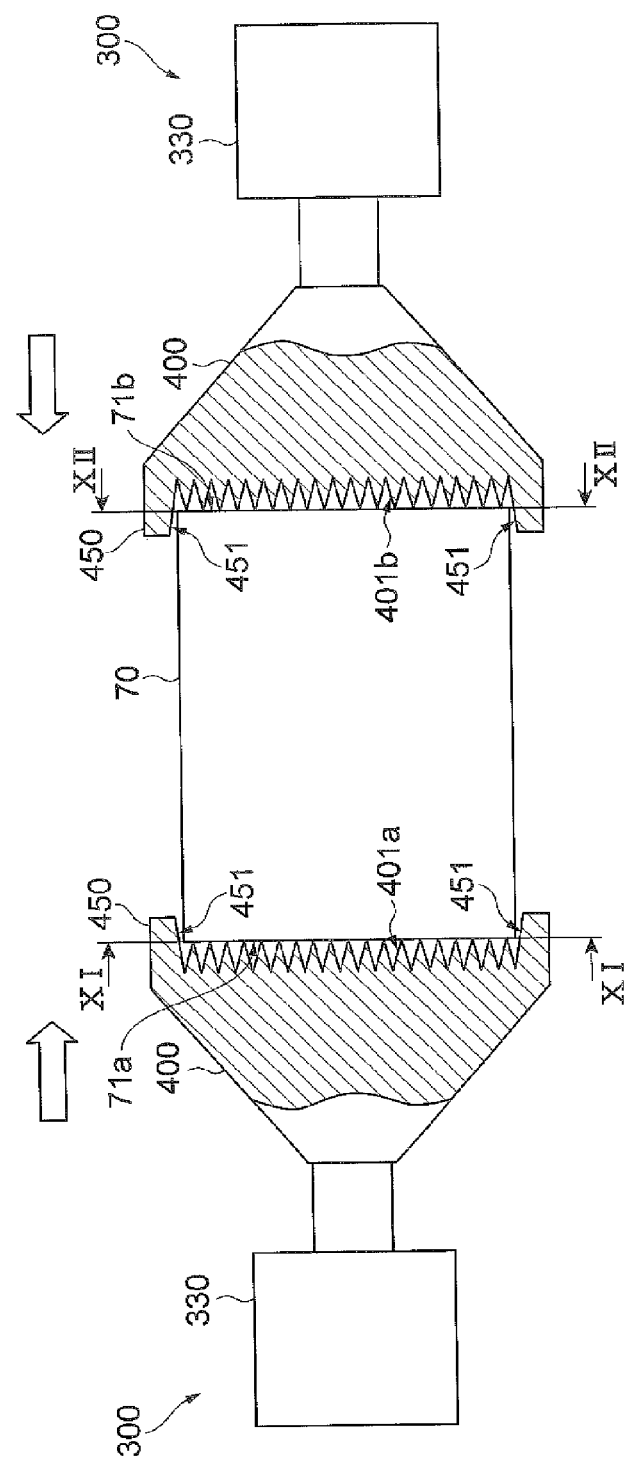
FIG. 10 is a partial cross-sectional view showing a state of the initial stage of a closing step of the green honeycomb molded body having the regular hexagonal cells according to the first embodiment.

Hereinafter, closing step of the green honeycomb molded body 70 of the present embodiment will be described. As shown in FIG. 10, in the present embodiment, the regular hexagonal cells 70h of the top surface 71a and the bottom surface 71b of the green honeycomb molded body 70 having the regular hexagonal cells 70h are closed at the same time. As show in FIG. 10, the ultrasonic closing machine 300, to which the closing jig 400 having the closing surface 401a is mounted, and the ultrasonic closing machine 300, to which the closing jig 400 having the closing surface 401b is mounted, are respectively prepared. The end at the top surface 71a side of the green honeycomb molded body 70 is inserted into the support socket portion 450 of the above-described closing jig 400 having the closing surface 401a. On the other hand, the end at the bottom surface 71b side of the green honeycomb molded body 70 is inserted into the support socket portion 450 of the above-described closing jig 400 having the closing surface 401b. Each closing jig 400 is vibrated by ultrasonic vibration from the horn portion 330.

Figure 11:
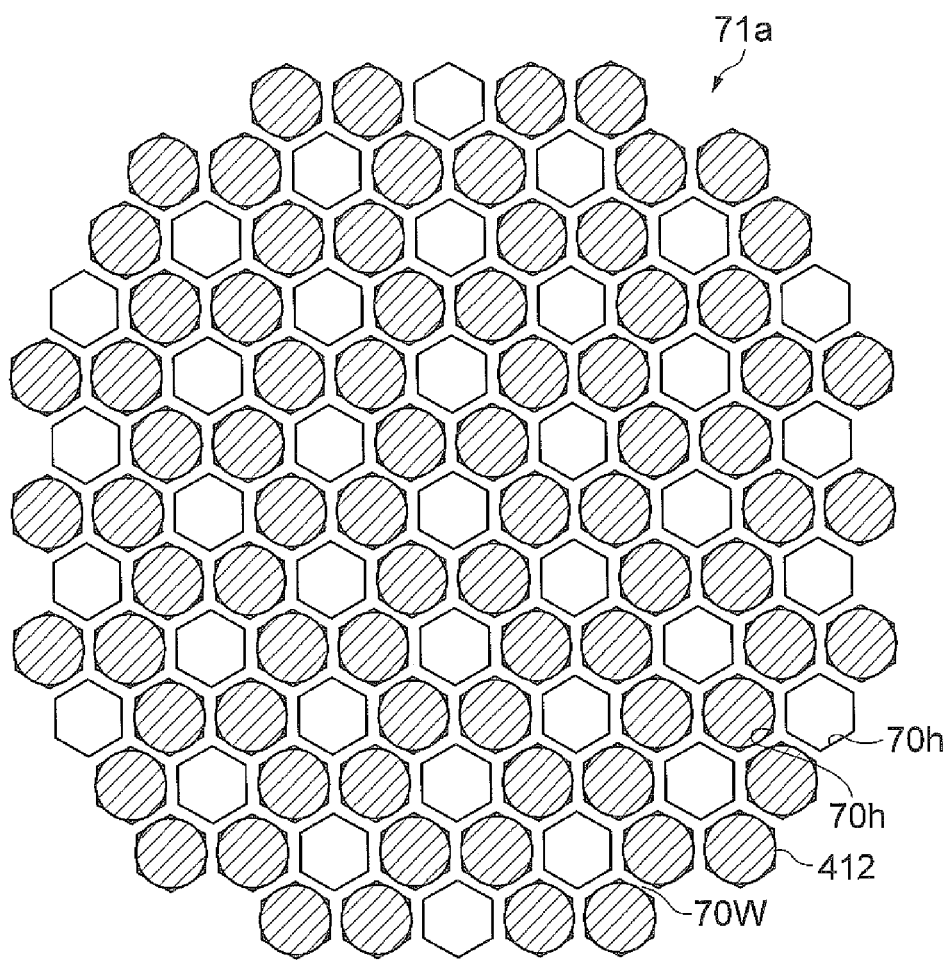
FIG. 11 is a cross-sectional view taken along line XI-XI in FIG. 10.
Figure 12:
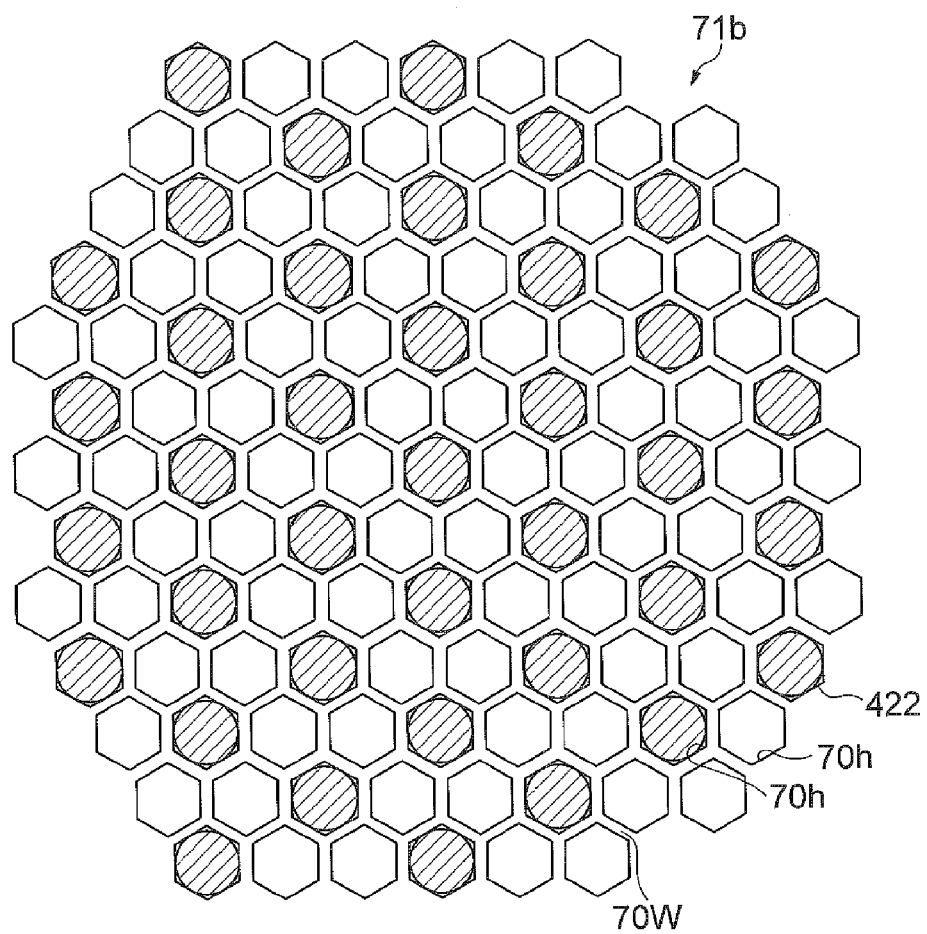
FIG. 12 is a cross-sectional view taken along line XII-XII in FIG. 10.

Each tip of the closing protrusions 410a and 410b of the closing surfaces 401a and 401b is inserted into the part of the regular hexagonal cells 70h. As shown in FIG. 11, in the top surface 71a, the conical tip end portions 412 of the closing protrusions 401a are inserted into the six regular hexagonal cells 70h, each of which is adjacent to the periphery of the one regular hexagonal cell 70h as a center. On the other hand, in the bottom surface 71b, as shown in FIG. 12, the closing protrusion 410b is inserted into the one regular hexagonal cell 70h, the periphery of which is surrounded by the adjacent six regular hexagonal cells 70h. As described above, the regular hexagonal cell 70h, into which the closing protrusion 410b is inserted in the bottom surface 71b, is the regular hexagonal cell 70h, into which the closing protrusion 410a is not inserted in the top surface 71a.

Figure 13:
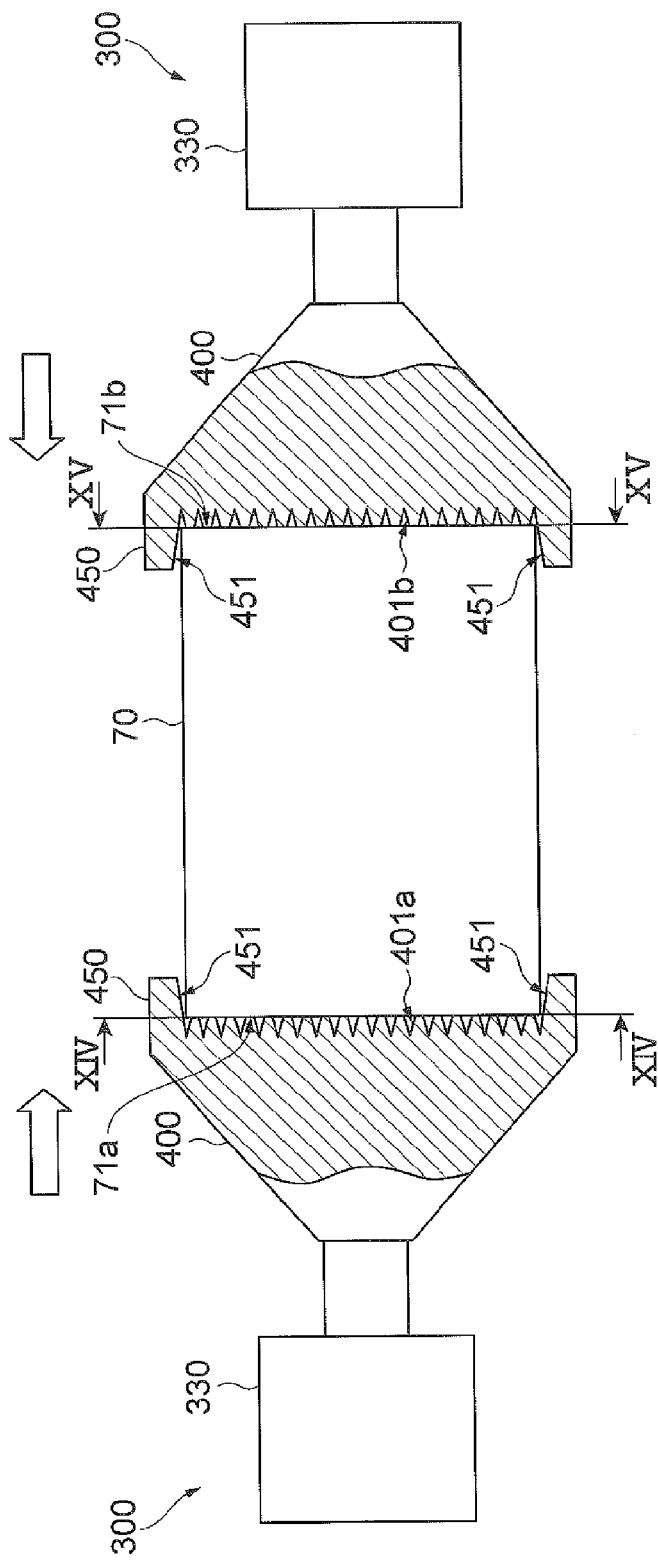
FIG. 13 is a partial cross-sectional view showing a state of the middle stage of the closing step in FIG. 10.
Figure 14:
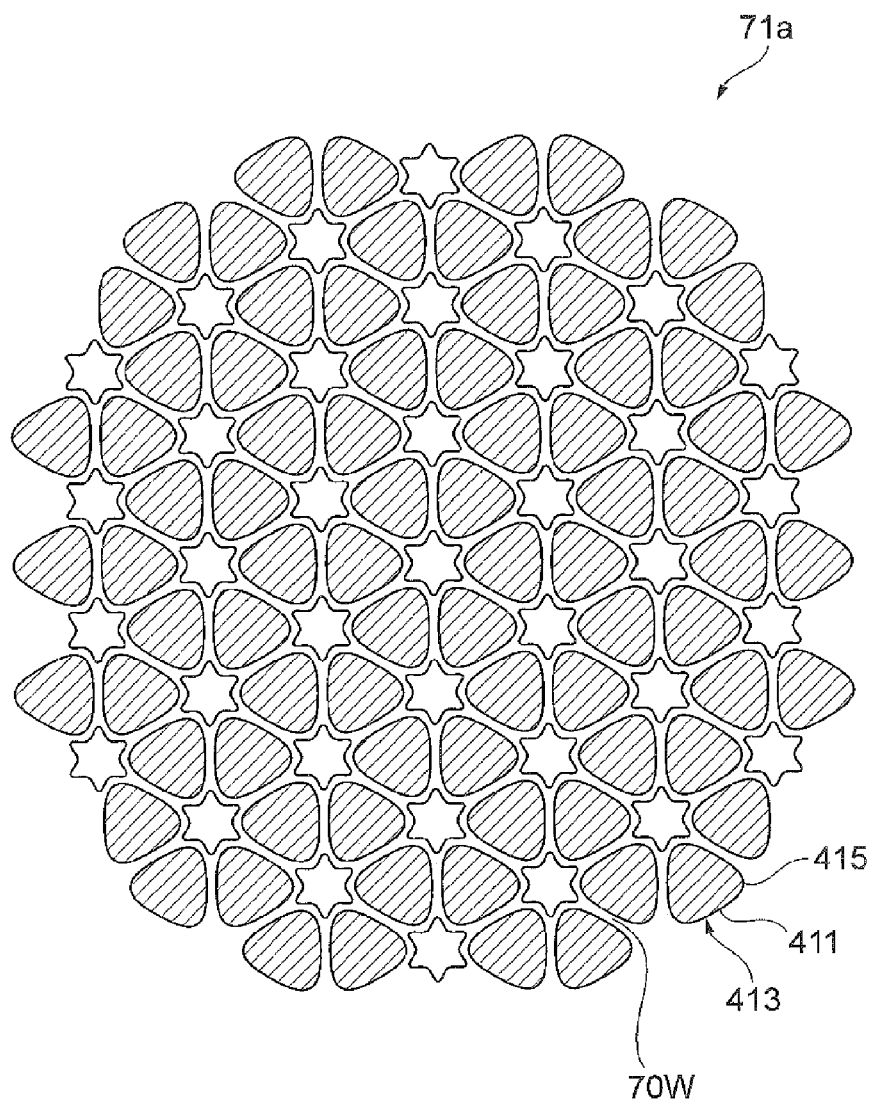
FIG. 14 is a cross-sectional view taken along line XIV-XIV in FIG. 13.

As shown in FIG. 13, when the closing protrusions 410a and 410b are further inserted into the regular hexagonal cells 70h, in the top surface 71a, as shown in FIG. 14, the triangular pyramidal base portion 411 of the closing protrusion 410a is inserted into the regular hexagonal cell 70h. Each round-chamfered lateral edge portion 415 of the triangular pyramidal base portion 411 is abutted on the partition wall 70W. Since the closing protrusions 410a are vibrated by the ultrasonic vibration, the partition walls 70W are liquefied and pushed to close the regular hexagonal cell 70h, into which the closing protrusion 410a has not been inserted. The regular hexagonal cell 70h is at the center of the six regular hexagonal cells 70h, into each of which the closing protrusion 410a is inserted.

Figure 15:
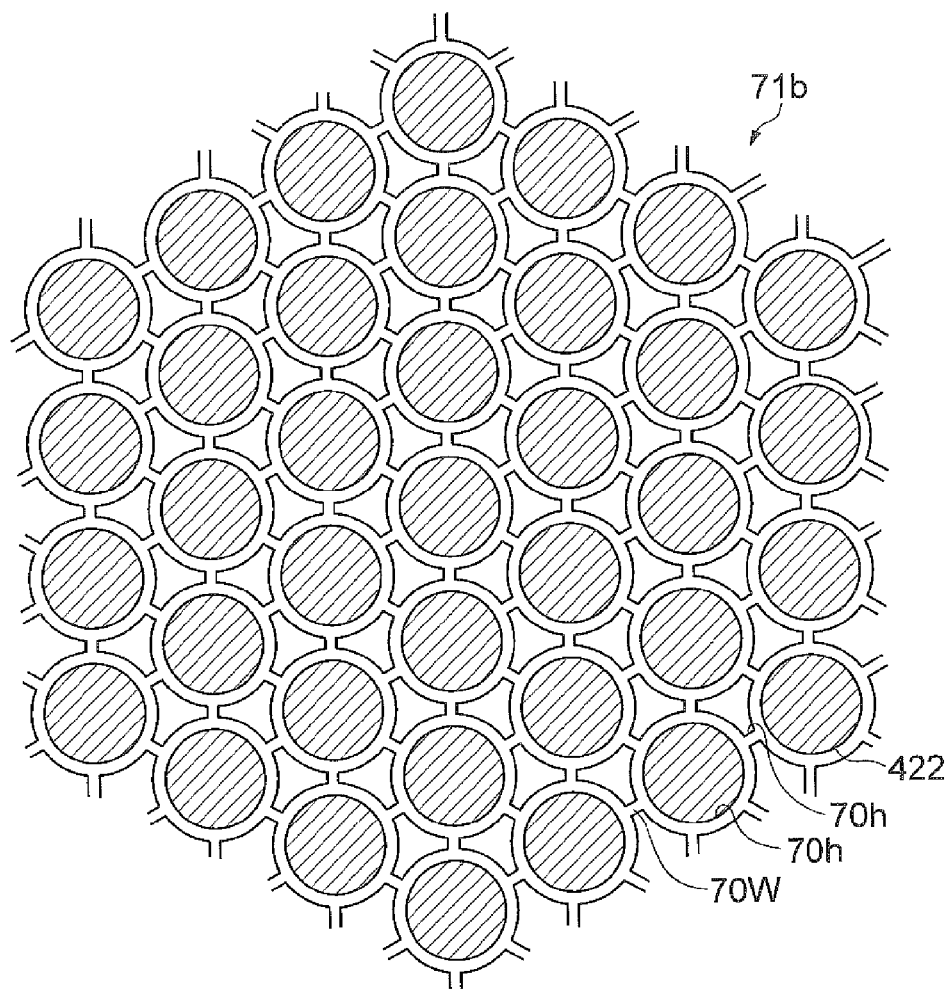
FIG. 15 is a cross-sectional view taken along line XV-XV in FIG. 13.

On the other hand, in the bottom surface 71b, as shown in FIG. 15, the conical side surface portion 422 of the closing protrusion 410b is abutted on the partition wall 70W. Since the closing protrusions 410b are vibrated by the ultrasonic vibration, the partition walls 70W are liquefied and pushed to close the regular hexagonal cells 70h, into which the closing protrusions 410b have not been inserted. The regular hexagonal cells 70h are in the middle of the regular hexagonal cells 70h, into each of which the closing protrusion 410b is inserted.

Figure 16:
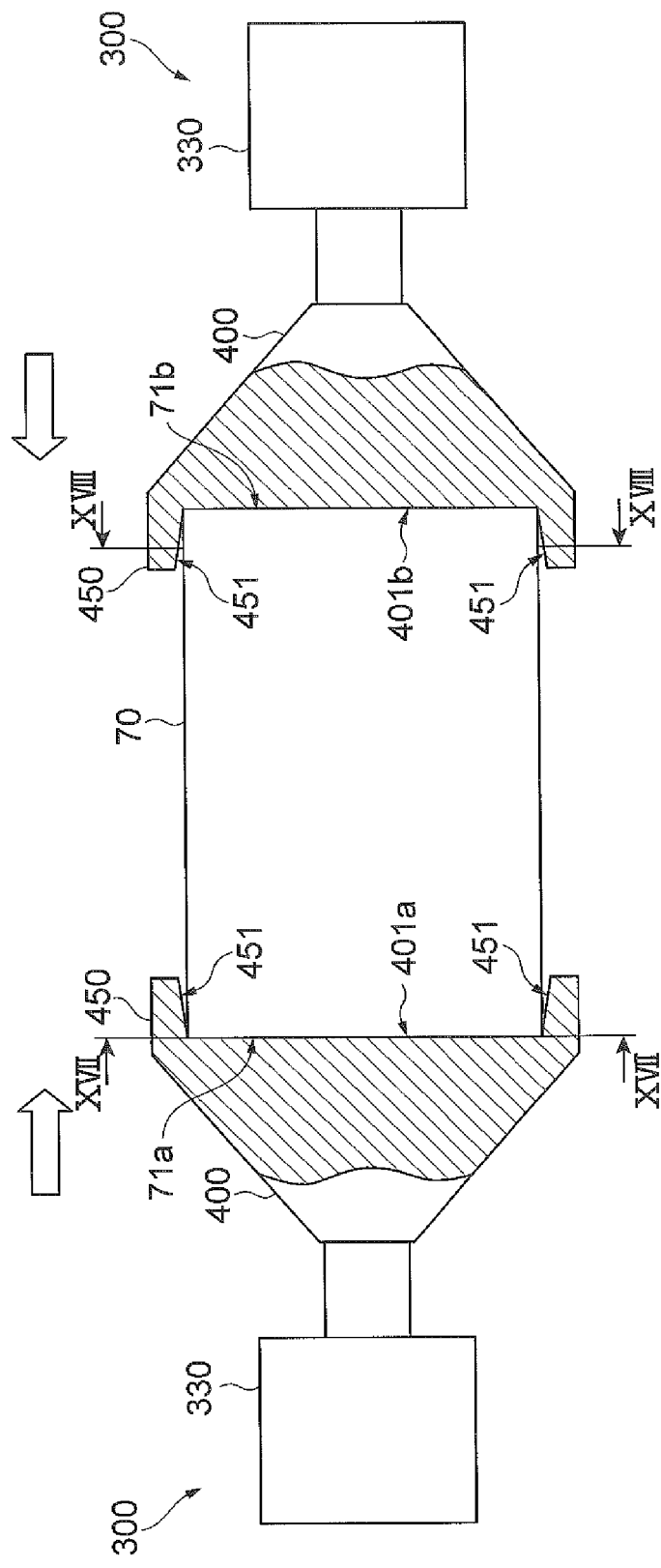
FIG. 16 is a partial cross-sectional view showing a state of the final stage of the closing step in FIG. 10.
Figure 17:
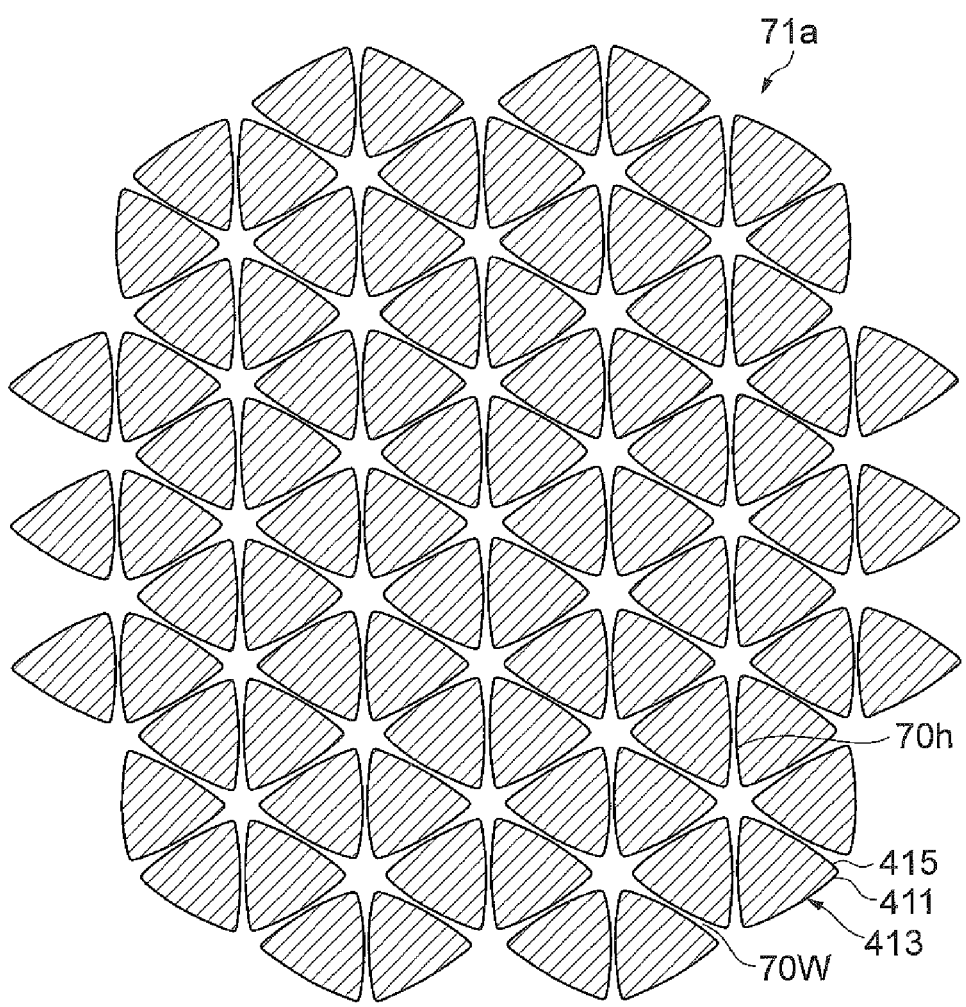
FIG. 17 is a cross-sectional view taken along line XVII-XVII in FIG. 16.

As shown in FIG. 16, when the closing protrusions 410a and 410b are further inserted into the regular hexagonal cell 70h, in the top surface 71a, as shown in FIG. 17, the partition walls 70W, which are pressed in the six directions while being liquefied by the round-chamfered lateral edge portions 415 and the triangular pyramid side surface portions 413 of the triangular pyramidal base portions 411, are integrated with each other by welding. The end of the welded partition wall 70W is abutted on the round-chamfered valley portion 414 of the closing surface 401a, and the closing is complete, in a state where rounding and chamfering corresponding to the shape of the round-chamfered valley portion 414 have been performed. As a result, in the top surface 71a being the supply side (inlet side) of the exhaust gas, the one regular hexagonal cell 70h surrounded by the six regular hexagonal cells 70h is closed. Each of six regular hexagonal cells 70h is adjacent to the periphery of the one regular hexagonal cell 70h.

Figure 18:
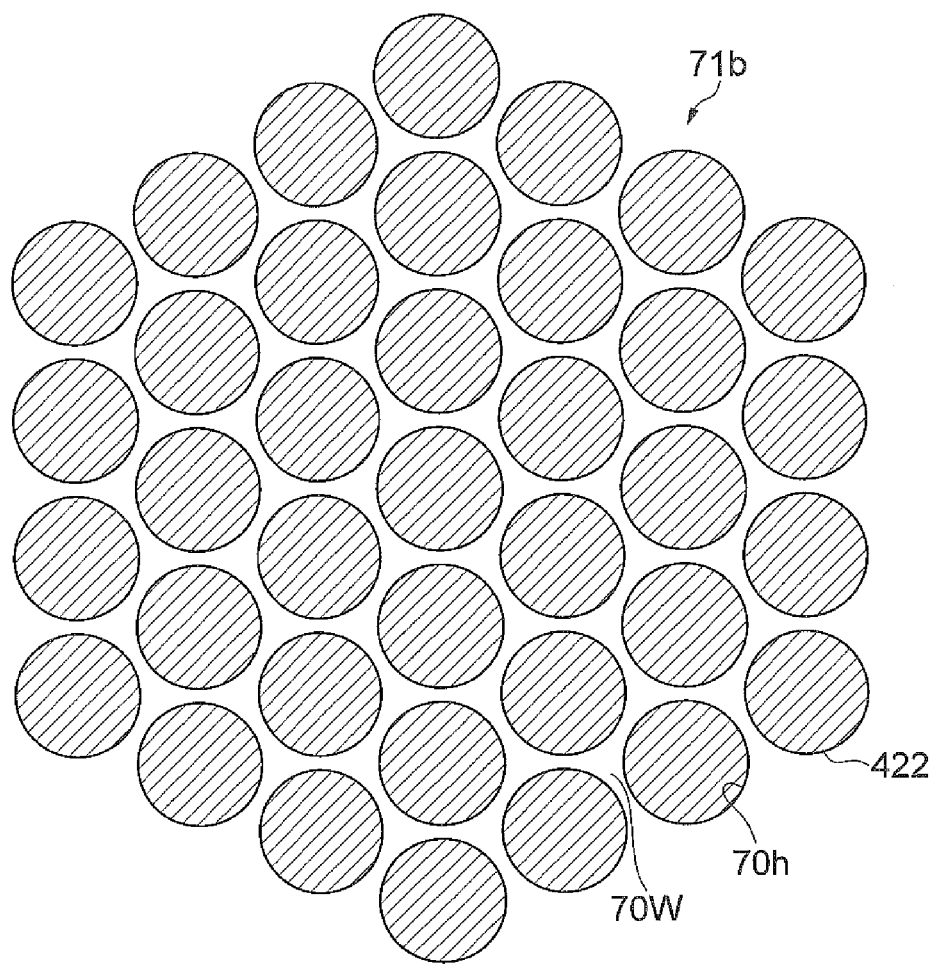
FIG. 18 is a cross-sectional view taken along line XVIII-XVIII in FIG. 16.

On the other hand, in the bottom surface 71b, as shown in FIG. 18, the partition walls 70W, which are pressed while being liquefied by the conical side surface portions 422 of the closing protrusions 410b, are integrated with each other by welding. The end of the welded partition wall 70W is abutted on the round-chamfered valley portion 414 of the closing surface 401b, and the closing is complete, in a state where rounding and chamfering corresponding to the shape of the round-chamfered valley portion 414 have been performed. As a result, in the bottom surface 71b being the exhaust side (outlet side) of the exhaust gas, the six regular hexagonal cells 70h are closed. Each of six regular hexagonal cells 70h is adjacent to the periphery of the one regular hexagonal cell 70h closed in the top surface 71a.

According to the present embodiment, in the closing step, the regular hexagonal cells 70h on both the top surface 71a and the bottom surface 71b of the green honeycomb molded body 70 are closed at the same time. Therefore, it is possible to close the regular hexagonal cells 70h more effectively compared with the method of closing the regular hexagonal cells 70h separately for the top surface 71a and the bottom surface 71b. In addition, in the present embodiment, in the regular hexagonal cells 70h of the top surface 71a and the bottom surface 71b of the green honeycomb molded body 70, each of the plurality of the closing protrusions 410a and 410b of the closing jig 400 is inserted into the part of the plurality of the regular hexagonal cells 70h. As a result, the regular hexagonal cells 70h are closed by welding the partition walls 70W with each other. Therefore, a closing paste like the conventional method is not required. Moreover, since the through holes are closed by welding the partition walls 70W with each other, for example, in a case where the honeycomb structure is used for the diesel particulate filter, the side, in which the regular hexagonal cells 70h have been closed by welding the partition walls 70W with each other, is made the side to supply the exhaust gas and/or the side to discharge the exhaust gas. As a result, turbulence of exhaust gas flow at the end surface of the side to supply the exhaust gas and/or the side to discharge the exhaust gas is reduced, and pressure drop can be reduced.

In addition, it is not necessary to close both the top surface 71*a* and the bottom surface 71*b* using the ultrasonic closing machine 300 as the present embodiment. It is possible to close the regular hexagonal cells 70*h* at least only at one side of the top surface 71*a* and the bottom surface 71*b*, by welding the partition walls 70W with each other by the ultrasonic closing machine 300.

In addition, in the present embodiment, by using the ultrasonic wave locally for the green honeycomb molded body 70, which becomes the honeycomb structure by being calcined, the green honeycomb molded body 70 is liquefied locally and the green honeycomb molded body 70 is processed. As a result, the cutting stock is less likely to be incurred in the cutting process and so on, and yield can be improved. In addition, a worked surface can be made excellent since fuzz and so on hardly occur.

In addition, in the present embodiment, the green honeycomb molded body 70 is cut at the end surface, by abutting the cutting blade 240, vibrated by the ultrasonic wave, on the green honeycomb molded body 70, immediately after being extrusion-molded from the raw material. By abutting the cutting blade 240 vibrated by the ultrasonic wave, the green honeycomb molded body 70 is liquefied. As a result, the cutting stock is less likely to be incurred in cutting and the yield can be improved. In addition, a cut surface can also be made smooth, since fuzz and so on hardly occur, and wrinkling of the cell to deform the shape of the regular hexagonal cells 70*h* can be prevented. Moreover, the cut surfaces of the green honeycomb molded body 70 by the cutting step can be made the top surface 71*a* and the bottom surface 71*b*, being the end surfaces of the honeycomb structure after being calcined. In this case, the conventional step can be omitted. In the conventional step, the green honeycomb molded body 70, being extrusion-molded from the raw material, is precisely cut after being dried by microwave and so on.

In the present embodiment, the closing jig 400 vibrated by the ultrasonic wave is inserted into the part of the plurality of regular hexagonal cells 70*h* of the green honeycomb molded body 70, which is immediately after being extrusion-molded from the raw material and being cut in a predetermined length. As a result, the regular hexagonal cells 70*h* are closed by welding the partition walls 70W. Since the closing is for the green honeycomb molded body 70, shrinking due to drying or calcining does not occur as the conventional method, in which the green honeycomb molded body 70 is closed after being dried and calcined. Therefore, the wrinkling of the cell can be prevented. In addition, the partition walls 70W are liquefied by inserting the closing protrusions 410*a* vibrated by the ultrasonic wave into the regular hexagonal cells 70*h*. Therefore, the worked surface can be made excellent since fuzz and so on hardly occur. Thus, the ends of the partition walls 70W are surely welded with each other and omission of the closing can be prevented. In addition, the regular hexagonal cells 70*h* are closed by welding the partition walls 70W with each other, the closing paste like the conventional method is not required.

In addition, in the present embodiment, the closing jig 400 of the green honeycomb molded body 70, which becomes the honeycomb structure by being calcined, has the plurality of closing protrusions 410*a*. The plurality of closing protrusions 410*a* are arranged in the position corresponding to the part of the plurality of regular hexagonal cells 70*h* and inserted respectively into the part of the plurality of the regular hexagonal cells 70*h*. As a result, the plurality of closing protrusions 410*a* closes the regular hexagonal cells 70*h* by welding the partition walls 70*w* with each other. The closing protrusion 410*a* has the conical tip end portion 412 and the triangular pyramidal base portion 411. The conical tip end portion 412 is positioned at the tip of the closing protrusion 410*a* and has the conical shape. The triangular pyramidal base portion 411 is positioned at the base of the closing protrusion 410*a* and has the truncated triangular pyramidal shape, in which, from the triangular pyramid with a vertical angle larger than that of the conical tip end portion 412, the triangular pyramid similarly reduced is removed. Since the conical tip end portion 412 has the conical shape, in which the vertical angle is an acute angle, even if the position of the regular hexagonal cell 70*h* of green honeycomb molded body 70 has been slightly shifted, the conical tip end portion 412 is more easily inserted into the regular hexagonal cell 70*h*. In addition, since the triangular pyramidal base portion 411 has the truncated triangular pyramidal shape, in which, from the triangular pyramid with a vertical angle larger than that of the conical tip end portion 412, the triangular pyramid similarly reduced is removed, the partition walls 70W can be more easily welded with each other by pushing and widening the partition walls 70W by their triangular pyramid side surface portions 413 and round-chamfered lateral edge portions 415. Therefore, it is possible to close the green honeycomb molded body 70 more effectively.

In addition, in the present embodiment, each lateral edge of each triangular pyramidal base portion 411 is the round-chamfered lateral edge portion 415 round-chamfered by a predetermined curvature. Therefore, it is possible to prevent the partition wall of the green honeycomb molded body from being cut by the lateral edges of the each triangular pyramidal base portion 411. In the present embodiment, the closing protrusions 410*a* vibrated by the ultrasonic wave are inserted into the regular hexagonal cells 70*h*. As a result, it is possible to effectively prevent the partition walls 70W from being cut, since lateral edges have been round-chamfered.

In addition, in the present embodiment, the valley between triangular pyramidal base portions 411 of the adjacent closing protrusions 410*a* is the round-chamfered valley portion 414 round-chamfered by a predetermined curvature. Therefore, since the ends of the partition walls 70W welded with each other by the closing protrusions 410*a* have been round-chamfered, it is possible to prevent the omission of closing by surely welding the ends of the partition walls 70W with each other. In addition, in a case where the honeycomb structure is used for the diesel particulate filter, turbulence of the exhaust gas flow at the end surface of the side to supply the exhaust gas and/or the side to discharge the exhaust gas is reduced, and pressure drop can be reduced.

In addition, in the present embodiment, the closing protrusions 410*a* are arranged in the position corresponding to the six regular hexagonal cells 70*h*, each of which is adjacent to the periphery of the one regular hexagonal cell 70*h* as a center. The one regular hexagonal cell 70*h* is one of the plurality of regular hexagonal cells 70*h* each having a hexagonal shape. The triangular pyramidal base portion 411 has the truncated triangular pyramidal shape, in which, from the triangular pyramid with a vertical angle larger than that of the conical tip end portion 412, the triangular pyramid similarly reduced is removed, and its round-chamfered lateral edge portion 415 abuts on the partition wall 70W. Therefore, the closing protrusions 410*a* are inserted into the six regular hexagonal cells 70*h*, each of which is adjacent to the periphery of the one regular hexagonal cell 70*h* as a center. In addition, the regular hexagonal cell 70*h* at the center of the six regular hexagonal cells 70h is pressed by the round-chamfered lateral edge portions 415 of the triangular pyramidal base portions 411 of the inserted closing protrusions 410a. Thus, the partition walls 70W are welded with each other and closed. As a result, in a case where the honeycomb structure is used for the diesel particulate filter, it is possible to close the side to supply the exhaust gas effectively.

Second Embodiment

Green Honeycomb Molded Body

Square Cell

Figure 19:
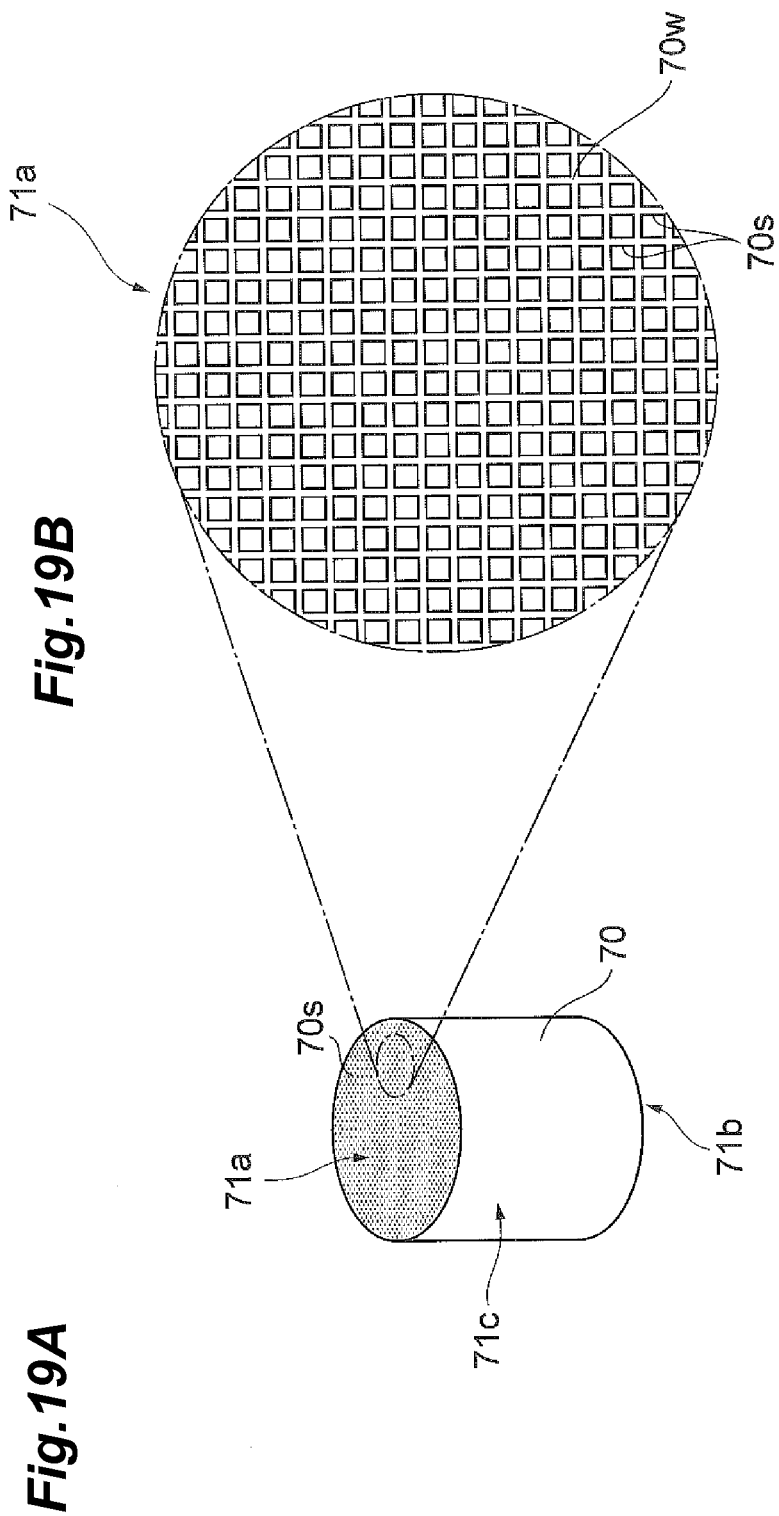
FIG. 19A is a perspective view of a green honeycomb molded body having square cells before closing.
FIG. 19B is a partially enlarged view of FIG. 19A.

Hereinafter, the second embodiment of the present invention will be described. First, a green honeycomb molded body, being an object to be processed in the second embodiment of the present invention, will be described. As shown in FIGS. 19(a) and 19(b), a green honeycomb molded body 70 according to the present embodiment has, for example, an top surface 71a, a bottom surface 71b, and a side surface 71c, and is a cylindrical body, in which a plurality of square cells 70s being square through holes is arranged substantially in parallel at the top surface 71a and the bottom surface 71b. The green honeycomb molded body 70 is a non-calcined molded body, which becomes a porous ceramic by being calcined later, and the configuration and the production method thereof other than the square cells 70s are the same as those of the green honeycomb molded body 70 having the regular hexagonal cells 70h. The square cells 70s are partitioned by partition walls 70w. The thickness of the partition wall 70w may be, for example, 0.15 to 0.76 mm. The size of one side of the square cell 70s may be, for example, 0.8 to 2.5 mm.

(Closing Jig)

Hereinafter, the closing jig of the present embodiment will be described. In the present embodiment, at both end surface of the green honeycomb molded body 70 having the square cells 70s, closing of the square cells 70s is performed in the same form. First, the closing jig to close the top surface 71a will be described. The top surface 71a becomes a supply side (inlet side) of exhaust gas, in a case where the green honeycomb molded body 70 is made a diesel particulate filter after being calcined.

Figure 20:
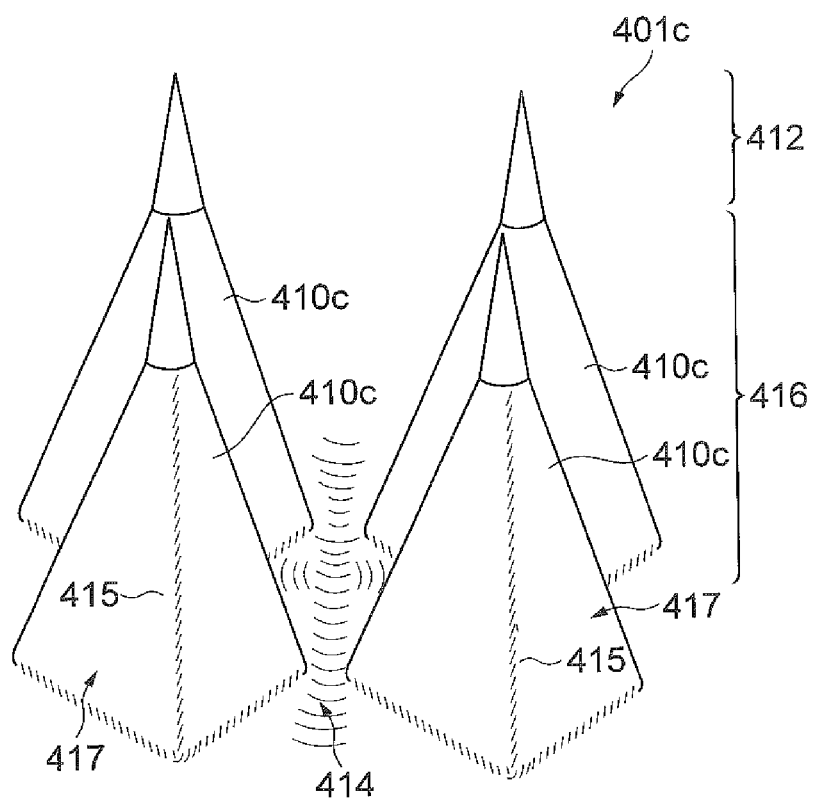
FIG. 20 is a perspective view, in which a part, corresponding to the portion A in FIG. 4 of a closing jig of the green honeycomb molded body having the square cells according to the second embodiment, is enlarged.
Figure 21:
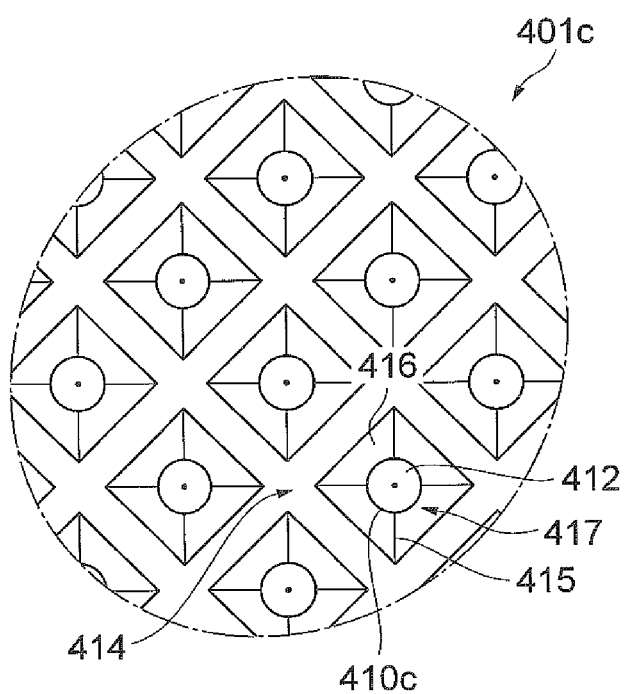
FIG. 21 is a plan view, in which a part, corresponding to the portion A in FIG. 4 of the closing jig for of the green honeycomb molded body having the square cells according to the second embodiment, is enlarged.

As shown in FIGS. 20 and 21, in which a part, corresponding to the above-described portion A in FIG. 4, is enlarged, a closing jig 400 of the present embodiment has closing protrusions 410c at a closing surface 401c of the closing jig 40 similar to the first embodiment. The closing protrusion 410c has a quadrangular pyramidal base portion 416 and a conical tip end portion 412. The quadrangular pyramidal base portion 416 is positioned in the base of the closing protrusion 410c and is protruded from the closing surface 401c. The quadrangular pyramidal base portion 416 has a truncated quadrangular pyramidal shape, in which, from the quadrangular pyramid with a vertical angle larger than that of the conical tip end portion 412, a quadrangular pyramid similarly reduced is removed. The conical tip end portion 412 is a tip part of the closing protrusion 410c and is positioned at the upper part of the quadrangular pyramidal base portion 416. The conical tip end portion 412 has a conical shape having a bottom surface with the size corresponding to the upper surface of the quadrangular pyramidal base portion 416. The vertical angle of the conical tip end portion 412 is smaller than the vertical angle formed by lateral edges of a truncated quadrangular pyramid of the quadrangular pyramidal base portion 416.

The quadrangular pyramidal base portion 416 includes a quadrangular pyramid side surface portion 417 of a side surface of the truncated quadrangular pyramid, and a round-chamfered lateral edge portion 415 of a side of a truncated triangular pyramid. In the round-chamfered lateral edge portion 415, each side of the truncated quadrangular pyramid is round-chamfered by a predetermined curvature. In addition, in a valley between quadrangular pyramidal base portions 416 of the adjacent closing protrusions 410c, a round-chamfered valley portion 414, being a recess round-chamfered by a predetermined curvature, is included.

As shown in FIG. 21, each closing protrusion 410c is arranged, so that each top of its conical tip end portion 412 is in the position corresponding to four square cells 70s. The four square cells 70s sandwich the partition wall 70w which partitions each side of the square cell 70s and are adjacent to the periphery of the square cell 70s as a center, which is one of the plurality of square cells 70s of the green honeycomb molded body 70. In addition, each closing protrusion 410c is arranged in a direction, in which the round-chamfered lateral edge portion 415 of the quadrangular pyramidal base portion 416 abuts on the partition wall 70w. The size of each quadrangular pyramidal base portion 416 is set, so that the length of a projection of the round-chamfered lateral edge portion 415 on the closing surface 401c from right above the closing surface 401c becomes the length between opposite sides of the square cell 70s of the green honeycomb molded body 70 or the length slightly shorter than it.

In a case where the green honeycomb molded body 70 is made a diesel particulate filter after being calcined, as the closing jig 400 to close the bottom surface 71b being an exhaust side (outlet side) of the exhaust gas, the closing jig 400 having the closing surface 401c is used. In the closing surface 401c, the closing protrusions 410c are arranged in the position corresponding to the square cells 70s, which are other than the square cells 70s corresponding to the closing protrusion 410c in the top surface 71a.

(Closing Step)

Figure 22:
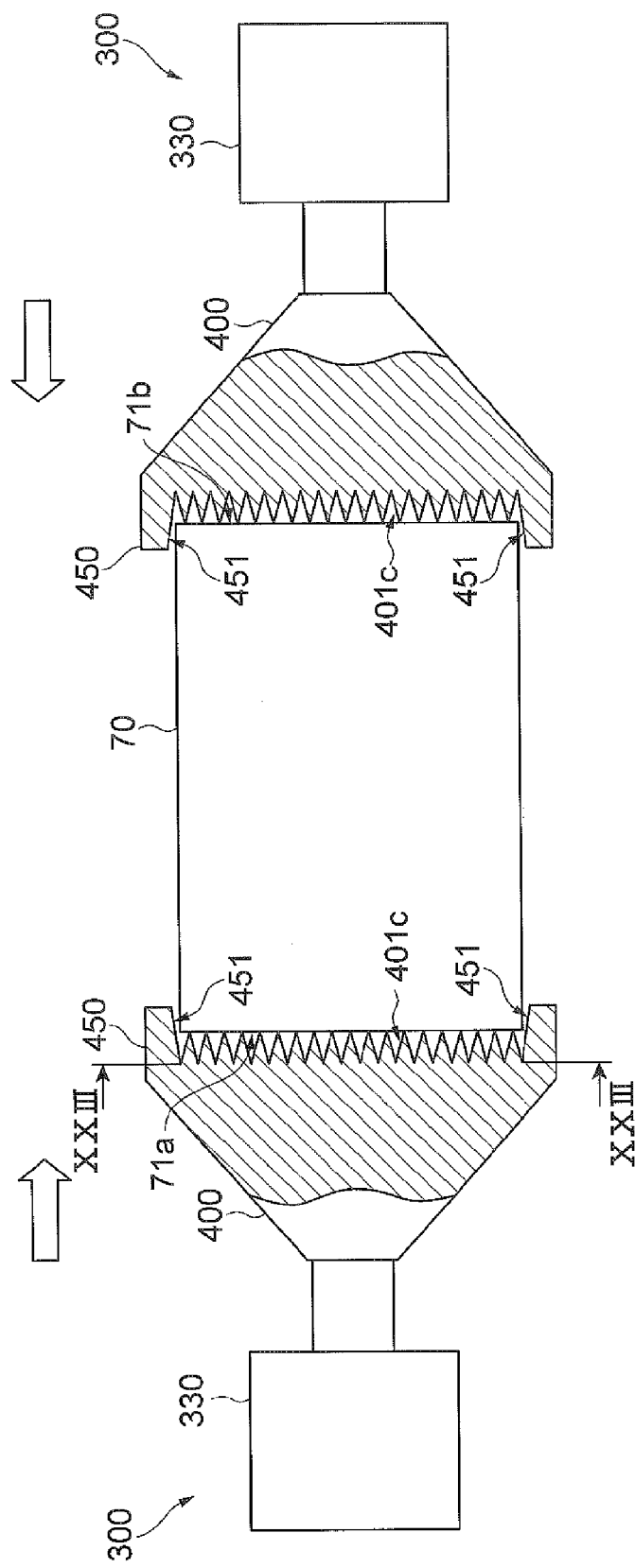
FIG. 22 is a partial cross-sectional view showing an initial state of the initial stage of a closing step of the green honeycomb molded body having the square cells according to the second embodiment.

Hereinafter, closing step of the green honeycomb molded body 70 of the present embodiment will be described. After cutting step, similar to the above-described first embodiment, is performed, closing of the green honeycomb molded body 70 is performed. As shown in FIG. 22, an ultrasonic closing machine 300, to which the closing jig 400 having the closing surface 401c is mounted, is prepared for the top surface 71a. In addition, for the bottom surface 71b, the ultrasonic closing machine 300, to which the closing jig 400 having the closing surface 401c is mounted, is prepared. In the closing surface 401c, the closing protrusions 410c are arranged in the position corresponding to the square cells 70s, which are other than the square cells 70s corresponding to the closing protrusion 410c in the top surface 71a.

Figure 23:
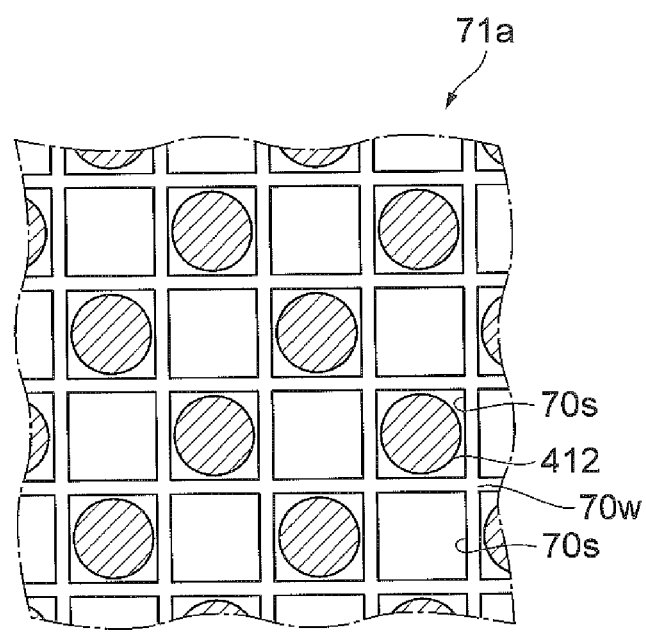
FIG. 23 is a cross-sectional view taken along line XXIII-XXIII in FIG. 22.

Each end at the top surface 71a side and the bottom surface 71b side of the green honeycomb molded body 70 is inserted into a support socket portion 450 of the closing jig 400 having the above-described closing surface 401c. Each closing jig 400 is vibrated by ultrasonic vibration from the horn unit 330. The tip of the closing protrusion 410c of the closing surface 401c is inserted into a part of the square cells 70s. As shown in FIG. 23, the conical tip end portion 412 of the closing protrusion 401c is inserted into four square cells 70s. The four square cells 70s sandwich the partition wall 70w which partitions each side of the square cell 70s and are adjacent to the periphery of the one square cell 70s as a center.

Figure 24:
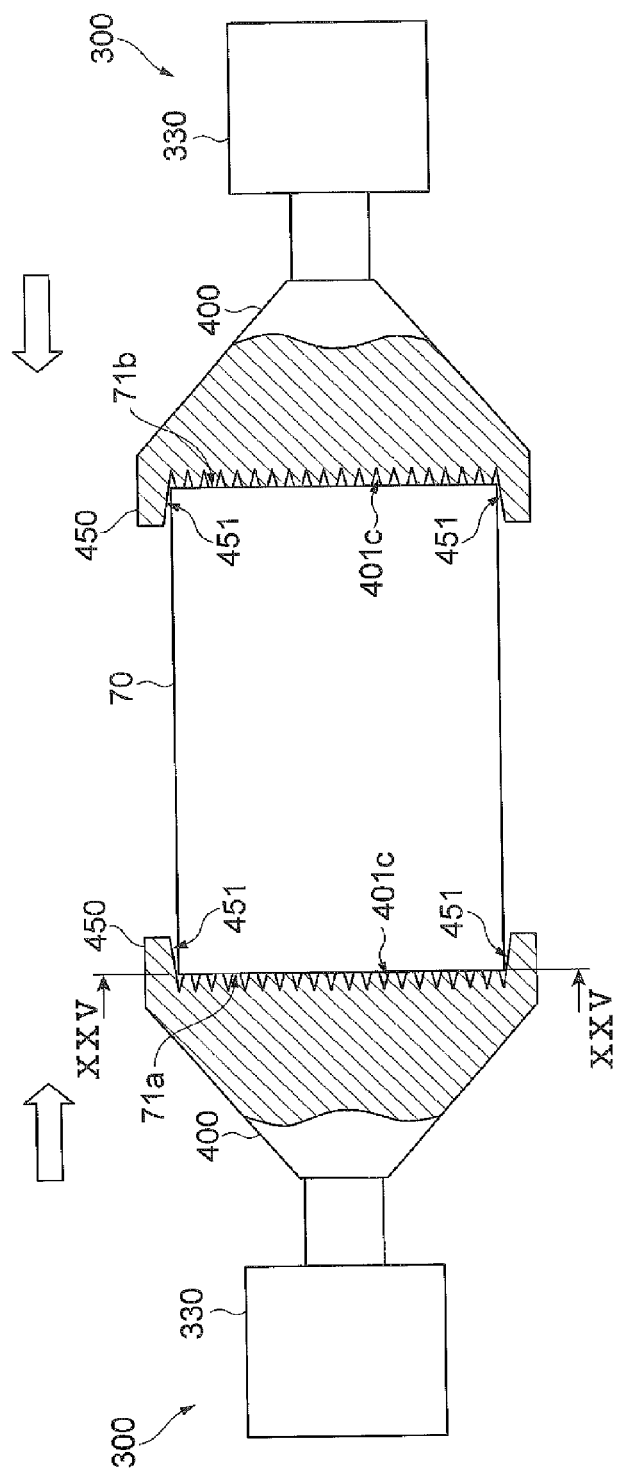
FIG. 24 is a partial cross-sectional view showing a state of the middle stage of the closing step in FIG. 22.
Figure 25:
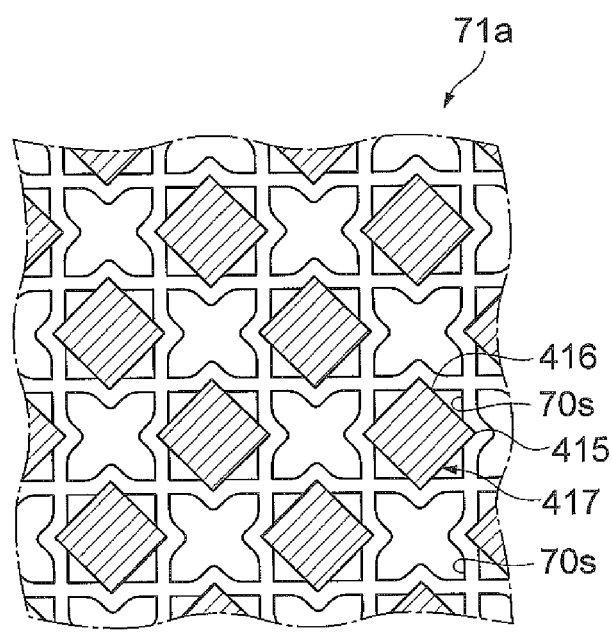
FIG. 25 is a cross-sectional view taken along line XXV-XXV in FIG. 24.

As shown in FIG. 24, when the closing protrusion 410c is further inserted into the square cell 70s, as shown in FIG. 25, the quadrangular pyramidal base portion 416 of the closing protrusion 410c is inserted into the square cell 70s. Each round-chamfered lateral edge portion 415 of the quadrangular pyramidal base portion 416 is abutted on the partition wall 70w. Since the closing protrusions 410c are vibrated by the ultrasonic vibration, the partition walls 70w are liquefied and pushed to close the square cell 70s, into which the closing protrusion 410c is not inserted. The square cell 70s is at the center of the four square cells 70s, into each of which the closing protrusion 410c is inserted.

Figure 26:
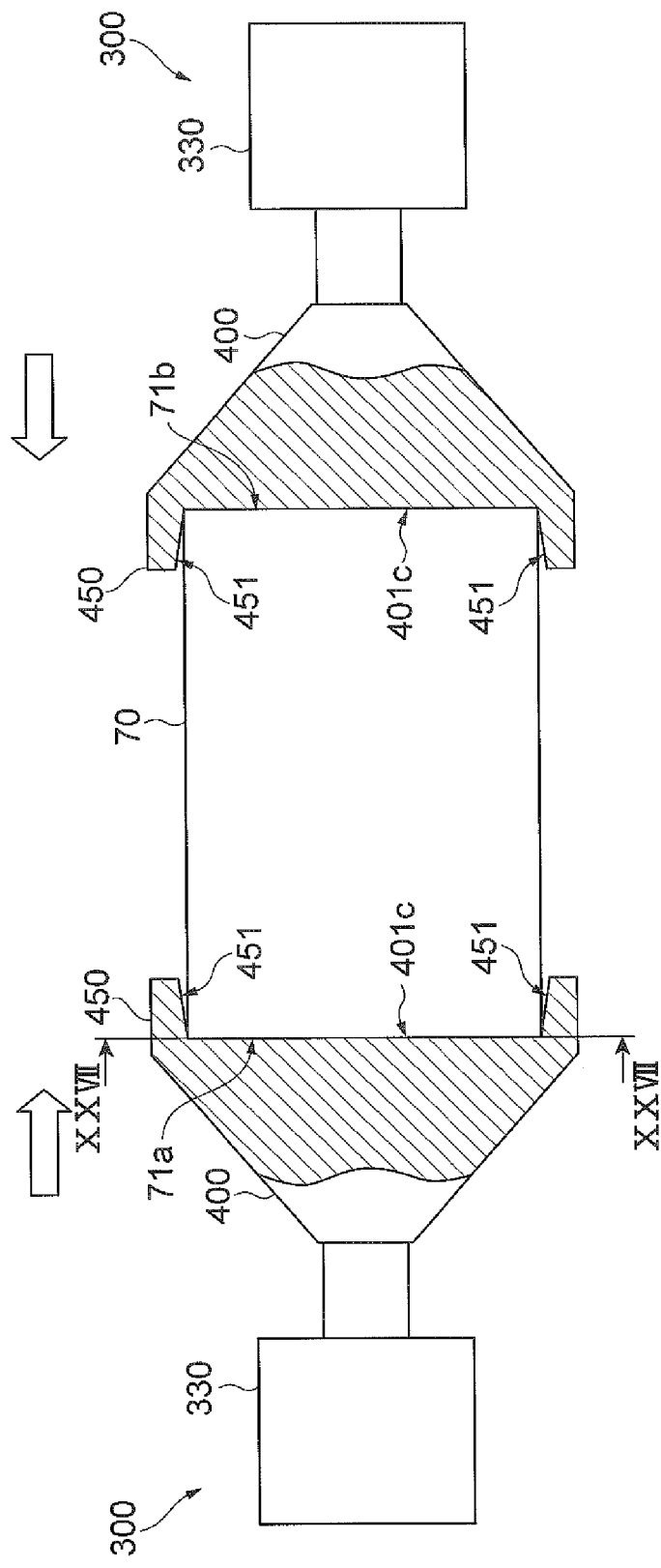
FIG. 26 is a partial cross-sectional view showing a state of the final stage of the closing step in FIG. 22.
Figure 27:
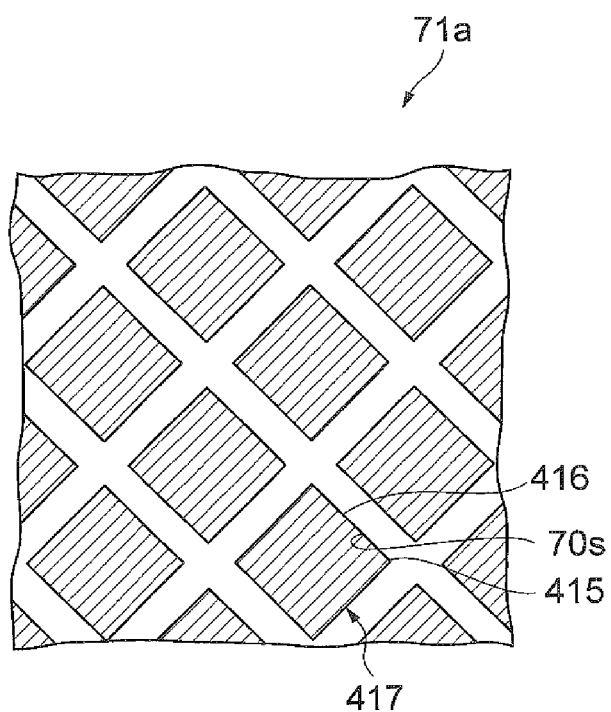
FIG. 27 is a cross sectional view taken along line XXVII-XXVII in FIG. 26.

As shown in FIG. 26, when the closing protrusions 410c are further inserted into the square cell 70s, as shown in FIG. 27, the partition walls 70w, which are pressed in the four directions while being liquefied by the round-chamfered lateral edge portion 415 and the quadrangular pyramid side surface portion 417 of the quadrangular pyramidal base portion 416, are integrated with each other by welding. The end of the welded partition wall 70w is abutted on the round-chamfered valley portion 414 of the closing surface 401c, and the closing is complete, in a state where rounding and chamfering corresponding to the shape of the round-chamfered valley portion 414 have been performed. As a result, in the top surface 71a being the supply side (inlet side) of the exhaust gas, the one square cell 70s surrounded by the four square cells 70s is closed. The four square cells 70s sandwich the partition wall 70w which partitions each side of the square cell 70s and are adjacent to the periphery of the one square cell 70s.

On the other hand, in the closing step of the top surface 71b being the exhaust side (outlet side) of the exhaust gas, in a case where the green honeycomb molded body 70 is made a diesel particulate filter after being calcined, the closing is performed in a similar way described above by the closing jig 400 having the closing surface 401c. In the closing surface 401c, the closing protrusions 410c are arranged in the position corresponding to the square cells 70s, which are other than the square cells 70s corresponding to the closing protrusion 410c in the top surface 71a. As a result, the square cells 70s, which are other than the square cells 70s closed in the top surface 71a, are closed in the bottom surface 71b.

According to the present embodiment, the closing protrusions 410c are arranged in the position corresponding to four square cells 70s. The four square cells 70s sandwich the partition wall 70w which partitions each side of the square cell 70s and are adjacent to the periphery of the square cell 70s as a center, which is one of the plurality of square cells 70s each having a square shape. The quadrangular pyramidal base portion 416 has the truncated quadrangular pyramidal shape, in which, from a quadrangular pyramid with a vertical angle larger than that of the conical tip end portion 412, the quadrangular pyramid similarly reduced is removed, and its round-chamfered lateral edge portion 415 abuts on the partition wall 70w. Therefore, the closing protrusion 410c is inserted into four square cells 70s. The four square cells 70s sandwich the partition wall 70w which partitions each side of the square cell 70s and are adjacent to the periphery of the one square cell 70s as a center. In addition, the square cell 70s at the center of the four square cells 70s is pressed by the round-chamfered lateral edge portion 415 of the quadrangular pyramidal base portion 416 of the inserted closing protrusion 410c. Thus, the partition walls 70w are welded with each other and closed. In this case, for example, by closing the square cell 70s, which is not closed at one end of the green honeycomb molded body 70, at the other end, it is possible to effectively close the side to supply and the side to discharge the exhaust gas, for example, in a case where the honeycomb structure is used for the diesel particulate filter. Moreover, the closing surface 401a and the closing surface 401b of the closing jig 400 are mechanically in parallel, and each of the closing surface 401a and the closing surface 401b of the closing jig 400 is arranged so as to correspond to the regular position of the square cell 70s at the top surface 71a and the bottom surface 71b. Therefore, correction of deformation, generated in the extrusion step or the above-described cutting step, and closing are performed at the same time.

Third Embodiment

Closing Jig

Figure 28:
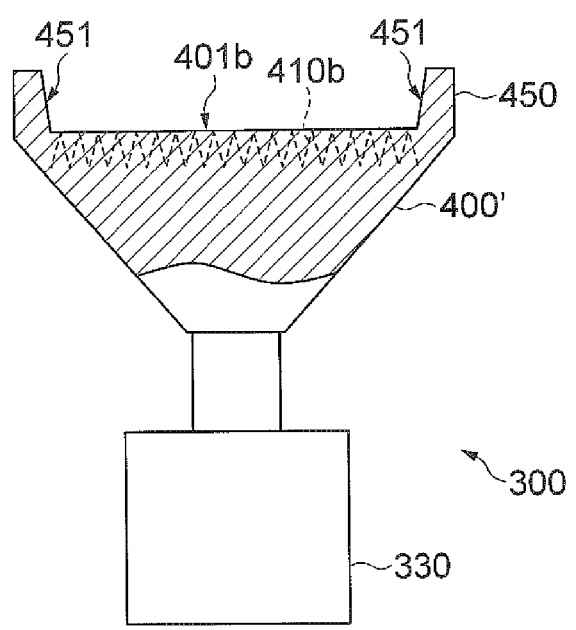
FIG. 28 is a partial cross-sectional view of a closing jig of a green honeycomb molded body according to the third embodiment, showing a state where closing protrusions are housed.
Figure 29:
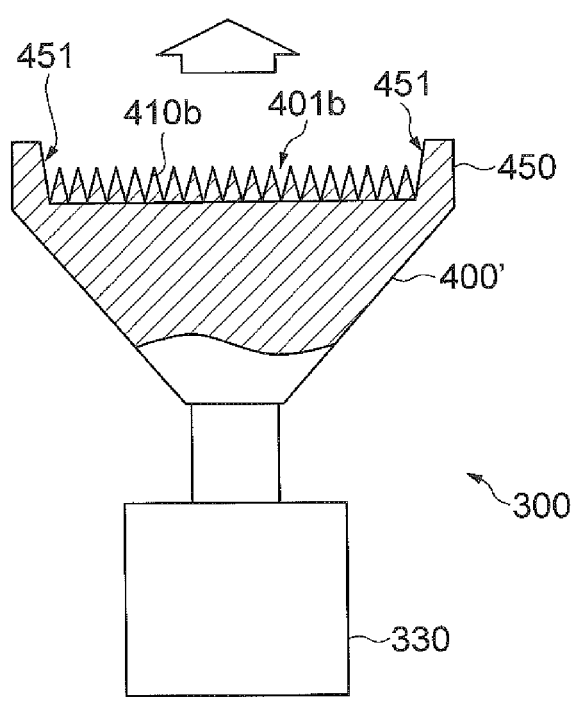
FIG. 29 is a partial cross-sectional view of the closing jig of the green honeycomb molded body according to the third embodiment, showing a state where closing protrusions are projected.

Hereinafter, the third embodiment of the present invention will be described. As shown in FIGS. 28 and 29, a closing jig 400' for a bottom surface 71b of a green honeycomb molded body 70 of the present embodiment is selectively changeable between a state where closing protrusions 410b are housed inside a closing surface 401b and a state where the closing protrusions 410b are protruded to the outside of the closing surface 401b. The closing protrusions 410b are arranged in a same way as the above first embodiment, and are freely housed inside the closing surface 401b through the hole with the same diameter of a bottom surface of the closing protrusions 410b, and are freely protruded to the outside of the closing surface 401b. The housing and protrusion of the closing protrusion 410b can be performed by air pressure or a hydraulic mechanism.

At the closing surface 401b in a state where the closing protrusions 410b have been housed, round-chamfered valley portions 414 similar to the above-described first embodiment remain, and the closing surface 401b may not necessarily be a complete flat surface. The above configuration is the same for the closing jig 400' for an top surface 71a of the green honeycomb molded body 70.

(Cutting Step)

Figure 30:
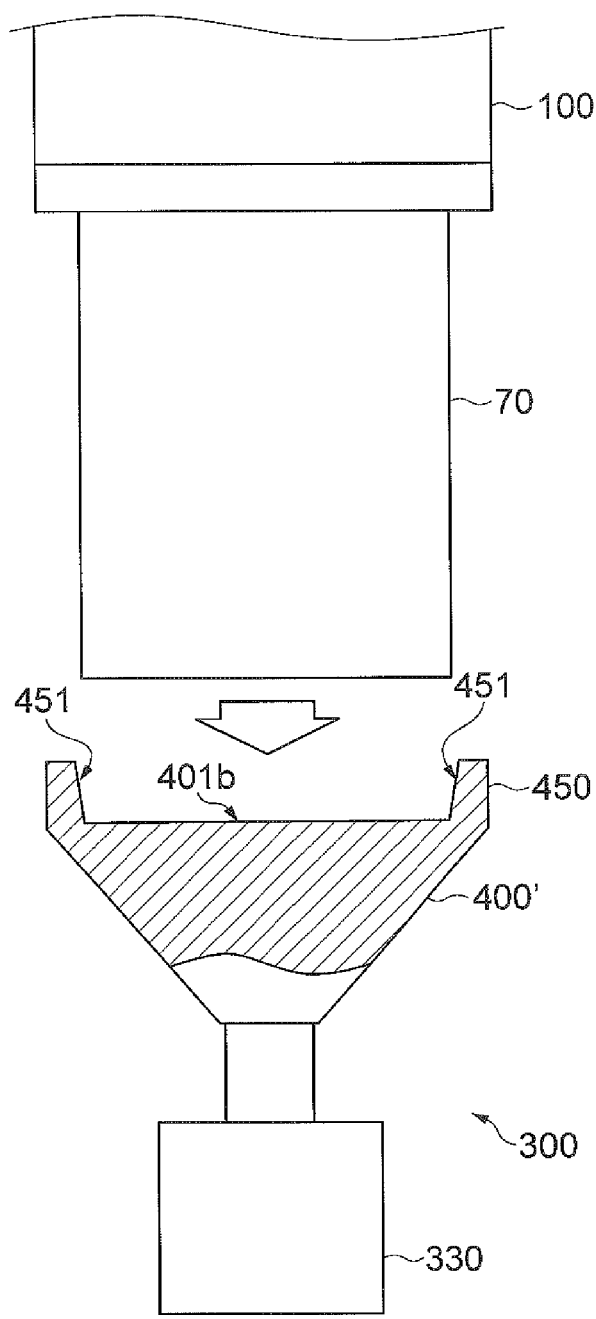
FIG. 30 is a partial cross-sectional view showing a state of the initial stage of a cutting step of the green honeycomb molded body according to the third embodiment.
Figure 31:
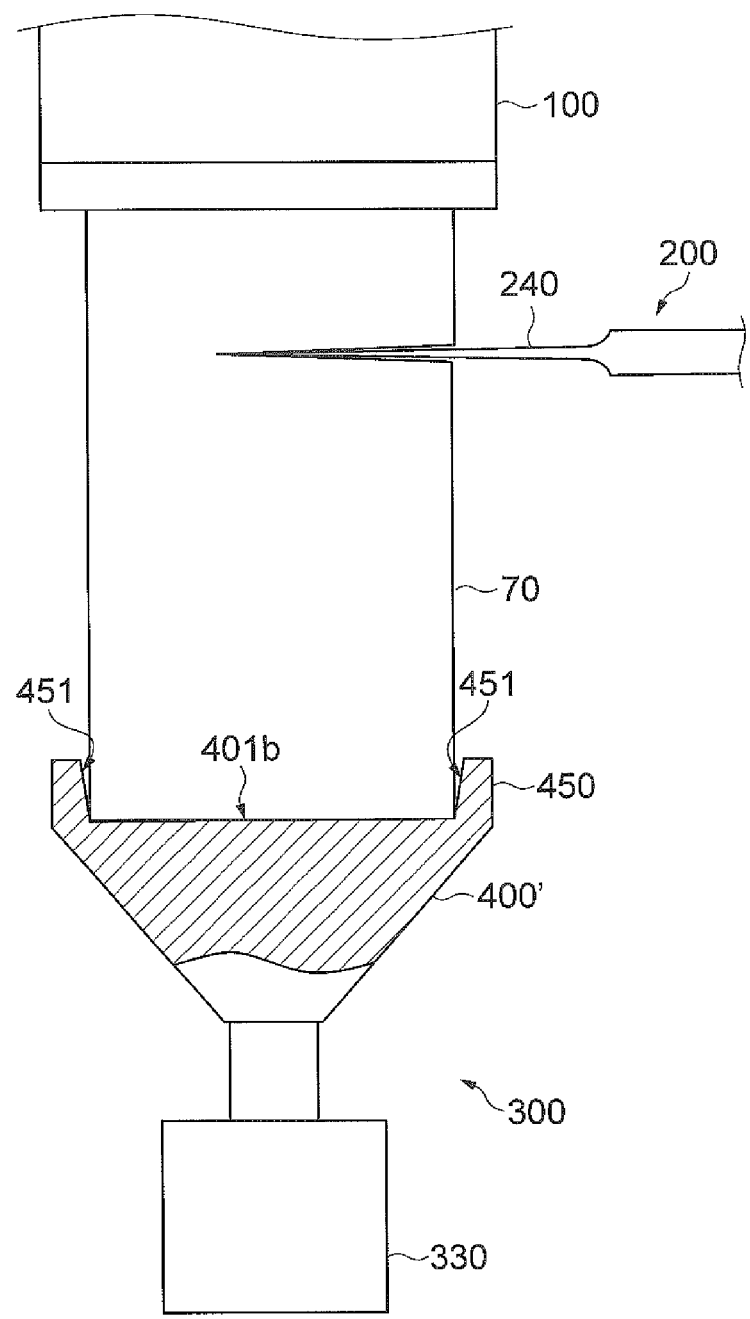
FIG. 31 is a partial cross-sectional view showing a state of the middle stage of the cutting step in FIG. 30.

Hereinafter, cutting step of the green honeycomb molded body 70 of the present embodiment will be described. As shown in FIG. 30, the bottom surface 71b of the green honeycomb molded body 70 is supported by the closing surface 401b of the closing jig 400', in which the green honeycomb molded body 70 is immediately after being extrusion-molded by an extrusion molding machine 100 from the raw material to vertically downward and has regular hexagonal cells 70h. At this time, the closing jig 400' is in a state where the closing protrusions 410b are housed inside the closing surface 401b. Next, as shown in FIG. 31, the green honeycomb molded body 70 is cut by a cutting blade 240 of a ultrasonic cutting machine 200, in a state where the green honeycomb molded body 70 is supported by the closing jig 400'.

(Closing Step)

Figure 32:
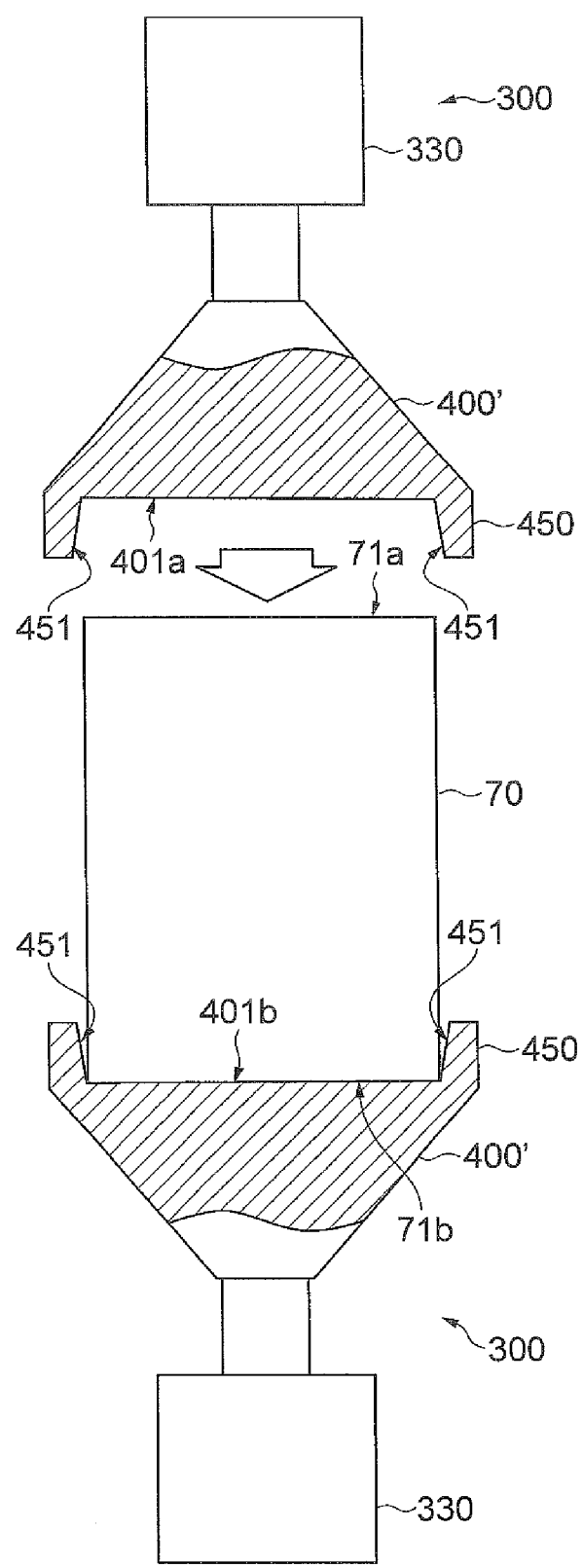
FIG. 32 is a partial cross-sectional view showing a state of the initial stage of a closing step of the green honeycomb molded body according to the third embodiment.
Figure 33:
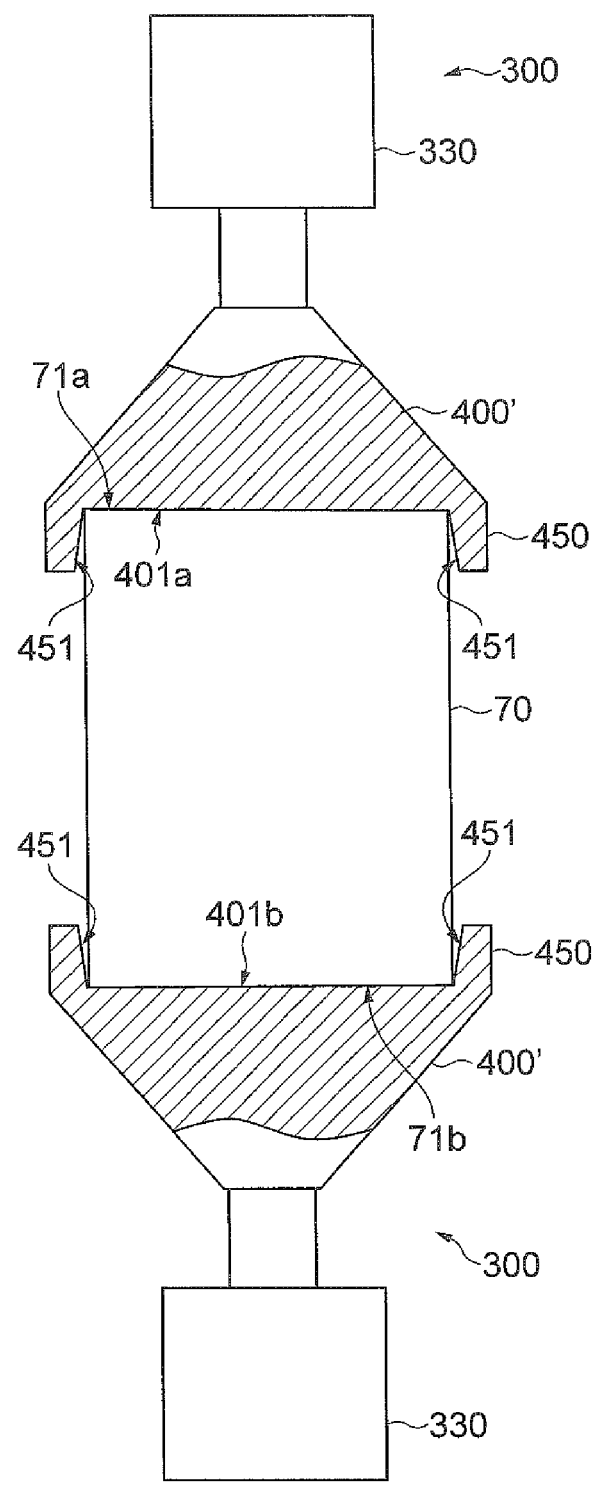
FIG. 33 is a partial cross-sectional view showing a state of the middle stage of the closing step in FIG. 32.

Next, closing step of the green honeycomb molded body 70 of the present embodiment will be described. As shown in FIGS. 32 and 33, the top surface 71a cut in the cutting step is supported by a closing surface 401a of the closing jig 400'. At this time, the closing jig 400' is in a state where closing protrusions 410a are housed inside the closing surface 401a.

Figure 34:
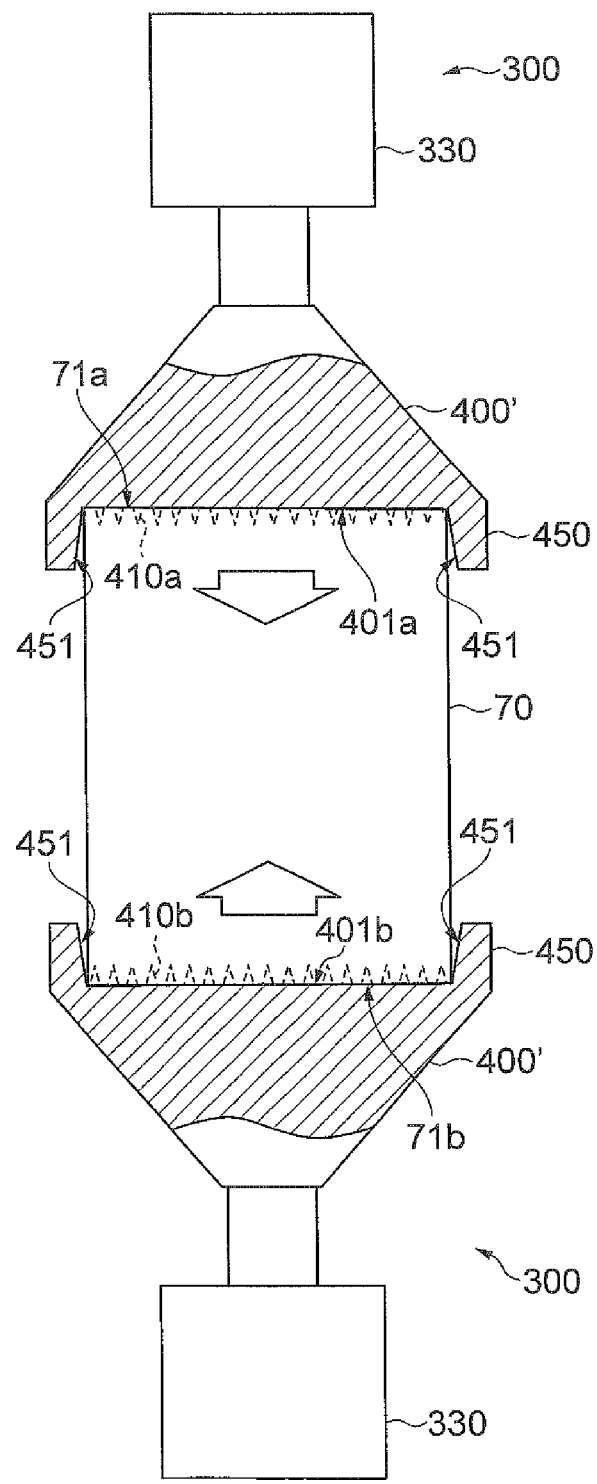
FIG. 34 is a partial cross-sectional view showing a state where the closing step in FIG. 33 is further proceeded.

Next, as shown in FIG. 34, closing protrusions 410a and 410b are protruded from each of the closing surfaces 401a and 401b of the closing jig 400', and each of the closing protrusions 410a and 410b is inserted into the part of the regular hexagonal cells 70h. As a result, the closing of the regular hexagonal cells 70h is performed in a similar way as the above-described first embodiment.

It is not necessary to close both the top surface 71a and the bottom surface 71b as the present embodiment using the ultrasonic closing machine 300. The closing of the regular hexagonal cells 70h may be performed at least only at one side of the top surface 71a and the bottom surface 71b, by welding the partition walls 70W with each other by the ultrasonic closing machine 300. In this case, in the top surface 71a, the closing can be performed by the closing jig 400' having the closing surface 401a, and in the bottom surface 71b, the closing can be performed using the closing member similar to the conventional case for the regular hexagonal cells 70h, which have not been closed at the top surface 71a. Otherwise, in the bottom surface 71b, the closing can be performed by the closing jig 400' having the closing surface 401b, and in the top surface 71a, the closing can be performed using the closing member similar to the conventional case for the regular hexagonal cells 70h, which have not been closed at the bottom surface 71b.

As the diameter of the green honeycomb molded body 70 becomes larger, bend by gravity increases when the green honeycomb molded body 70 is extrusion-molded from the raw material in the horizontal direction. Therefore, there may be a case where it is difficult to support the green honeycomb molded body 70 by a side surface 71c. However, according to the present embodiment, the bottom surface 71b of the green honeycomb molded body 70, which is immediately after being extrusion-molded by the extrusion molding machine 100 from the raw material to vertically downward, is supported by the closing jig 400'. As a result, even the green honeycomb molded body 70 has the large diameter, the green honeycomb molded body 70 can be supported without causing bend or distortion of the regular hexagonal cell 70h. Moreover, in the subsequent closing step, each of the plurality of closing protrusions 410a and 410b of the closing jig 400' is inserted into the part of the regular hexagonal cells 70h of the supported green honeycomb molded body 70. As a result, the regular hexagonal cells 70h are closed by welding the partition walls 70W with each other. As a result, supporting and closing of the green honeycomb molded body 70 can be performed successively with great efficiency.

In addition, according to the present embodiment, the closing jig 400' is selectively changeable between the state where the closing protrusions 410b are housed inside the closing surface 401b and the state where the closing protrusions 410b are protruded to the outside of the closing surface 401b. The bottom surface 70b of the green honeycomb molded body 70, which is immediately after being extrusion-molded by the extrusion molding machine 100 from the raw material to vertically downward, is supported by the closing surface 401b of the closing jig 400', in the state where the closing protrusions 410b are housed inside the closing surface 401b. Therefore, even the green honeycomb molded body 70 has the large diameter, the green honeycomb molded body 70 can be more stably supported without causing bend or distortion of the regular hexagonal cell 70h. In addition, in the closing step, each of the closing protrusions 410b of the closing jig 400', in the state where the closing protrusions 410b are protruded to the outside of the closing surface 401b, is inserted into the part of the regular hexagonal cells 70h of the bottom surface 71b of the green honeycomb molded body 70. As a result, the regular hexagonal cells 70h are closed by welding the partition walls 70W with each other. As a result, the hexagonal cells 70h can be closed by welding the partition walls 70W with each other, while supporting the green honeycomb molded body 70.

The present invention is not limited to the above embodiments, and various modified embodiments are possible.

INDUSTRIAL APPLICABILITY

According to a production method for a honeycomb structure of one embodiment of the present invention, closing of through holes can be performed more effectively, a closing member such as a closing paste is not separately required, and pressure drop, at the end surface of the side to supply the exhaust gas, can be reduced.

REFERENCE SIGNS LIST 70 green honeycomb molded body
71a top surface
71b bottom surface
71c side surface
70h regular hexagonal cell
70W partition wall
70s square cell
70w partition wall
100 extrusion molding machine
120 stand
140 roller conveyor
200 ultrasonic cutting machine
210 ultrasonic signal transmitter
220 ultrasonic vibrator unit
230 horn unit
240 cutting blade
300 ultrasonic closing machine
310 ultrasonic signal transmitter
320 ultrasonic vibrator unit
330 horn unit
400 closing jig
400' closing jig
401a, 401b, 401c closing surface
410a, 410b, 410c closing protrusion
411 triangular pyramidal base portion
412 conical tip end portion
413 triangular pyramid side surface portion
414 round-chamfered valley portion
415 round-chamfered lateral edge portion
416 quadrangular pyramidal base portion
417 quadrangular pyramid side surface portion
422 conical side surface portion
450 support socket portion
451 inclined surface

The invention claimed is:

1. A production method for a honeycomb structure, in which a plurality of holes is opened at end surfaces of a columnar body, comprising:
    a closing step of closing a part of a plurality of through holes of a green honeycomb molded body, in which the plurality of through holes partitioned from each other by a partition wall is opened at the end surfaces of the columnar body and which becomes the honeycomb structure by being calcined,
    wherein in the closing step
    the through holes of the both end surfaces of the green honeycomb molded body are closed at the same time, and
    the through holes of at least the one end surface of the green honeycomb molded body are closed by welding the partition walls with each other, by inserting each of a plurality of closing protrusions of a closing jig into the part of a plurality of the through holes.

2. The production method for the honeycomb structure according to claim 1,
    wherein in the closing step, the through holes are closed by welding the partition walls with each other, by inserting each of the closing protrusions vibrated by ultrasonic wave into the part of the plurality of through holes.

3. The production method for the honeycomb structure according to claim 1, further comprising:
- a supporting step of supporting the end surface at a lower side of the green honeycomb molded body, which is immediately after being extrusion-molded from a raw material to vertically downward, by the closing jig,
- wherein in the closing step, the through holes are closed by welding the partition walls with each other, by inserting each of the plurality of closing protrusions of the closing jig into the part of the through holes of at least the end surface at the lower side of the green honeycomb molded body, after being supported in the supporting step.

4. The production method for the honeycomb structure according to claim 2, further comprising:
- a supporting step of supporting the end surface at a lower side of the green honeycomb molded body, which is immediately after being extrusion-molded from a raw material to vertically downward, by the closing jig,
- wherein in the closing step, the through holes are closed by welding the partition walls with each other, by inserting each of the plurality of closing protrusions of the closing jig into the part of the through holes of at least the end surface at the lower side of the green honeycomb molded body, after being supported in the supporting step.

5. The production method for the honeycomb structure according to claim 3,
- wherein the closing jig is selectively changeable between a state where the closing protrusions are housed inside a supporting surface and a state where the closing protrusions are protruded to the outside of the supporting surface,
- in the supporting step, the end surface at the lower side of the green honeycomb molded body, which is immediately after being extrusion-molded from the raw material to vertically downward, is supported by the supporting surface of the closing jig, in the state where the closing protrusions are housed inside the supporting surface, and
- in the closing step, the through holes are closed by welding the partition walls with each other, by inserting each of the closing protrusions of the closing jig, in the state where the closing protrusions are protruded to the outside of the supporting surface, into the part of the through holes at the end surface at the lower side of the green honeycomb molded body.

6. The production method for the honeycomb structure according to claim 4,
- wherein the closing jig is selectively changeable between a state where the closing protrusions are housed inside a supporting surface and a state where the closing protrusions are protruded to the outside of the supporting surface,
- in the supporting step, the end surface at the lower side of the green honeycomb molded body, which is immediately after being extrusion-molded from the raw material to vertically downward, is supported by the supporting surface of the closing jig, in the state where the closing protrusions are housed inside the supporting surface, and
- in the closing step, the through holes are closed by welding the partition walls with each other, by inserting each of the closing protrusions of the closing jig, in the state where the closing protrusions are protruded to the outside of the supporting surface, into the part of the through holes at the end surface at the lower side of the green honeycomb molded body.

\* \* \* \* \*